United States Patent
Lee et al.

(10) Patent No.: US 12,169,950 B2
(45) Date of Patent: Dec. 17, 2024

(54) IMAGE SENSOR MODULE, IMAGE PROCESSING SYSTEM, AND IMAGE COMPRESSION METHOD

(71) Applicant: SAMSUNG ELECTRONICS CO., LTD., Suwon-si (KR)

(72) Inventors: Wonseok Lee, Suwon-si (KR); Seongwook Song, Seoul (KR); Yunseok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 318 days.

(21) Appl. No.: 17/374,426

(22) Filed: Jul. 13, 2021

(65) Prior Publication Data

US 2022/0020181 A1  Jan. 20, 2022

(30) Foreign Application Priority Data

Jul. 16, 2020 (KR) .................. 10-2020-0088452
Mar. 4, 2021 (KR) .................. 10-2021-0029045

(51) Int. Cl.
*G06T 9/00* (2006.01)
*G06T 3/40* (2024.01)
(Continued)

(52) U.S. Cl.
CPC .................. *G06T 9/00* (2013.01); *G06T 3/40* (2013.01); *H04N 19/105* (2014.11);
(Continued)

(58) Field of Classification Search
None
See application file for complete search history.

(56) References Cited

U.S. PATENT DOCUMENTS

| | | |
|---|---|---|
| 7,532,762 B2 | 5/2009 | Sekiguchi et al. |
| 7,671,909 B2 | 3/2010 | Uvarov et al. |

(Continued)

FOREIGN PATENT DOCUMENTS

| | | |
|---|---|---|
| CN | 1893618 | 1/2007 |
| CN | 110113547 | 8/2019 |

(Continued)

OTHER PUBLICATIONS

1st Office Action issued Feb. 1, 2024 in corresponding TW Patent Appln. No. 110125865.

(Continued)

*Primary Examiner* — Tahmina N Ansari
(74) *Attorney, Agent, or Firm* — F. Chau & Associates, LLC

(57) ABSTRACT

Provided are an image sensor module, an image processing system, and an image compression method. The image compression method of compressing image data generated by an image sensor includes: receiving pixel values of a target pixel group of image data on which compression is to be performed, and reference values of reference pixels to be used in compression of the target pixel group; determining an averaging direction in which an averaging calculation is to be performed on target pixel values; averaging the pixel values of target pixels in the averaging direction; generating balance information including compensation values to be applied to the average values based on the reference pixels; and generating a bitstream based on the average values, the balance information, and compression information.

20 Claims, 21 Drawing Sheets

(51) Int. Cl.
*H04N 19/105* (2014.01)
*H04N 19/176* (2014.01)
*H04N 19/182* (2014.01)
*H04N 19/186* (2014.01)

(52) U.S. Cl.
CPC ......... *H04N 19/176* (2014.11); *H04N 19/182* (2014.11); *H04N 19/186* (2014.11)

(56) References Cited

U.S. PATENT DOCUMENTS

| | | | |
|---|---|---|---|
| 7,689,051 | B2 | 3/2010 | Mukerjee |
| 8,244,049 | B2 | 8/2012 | Lee et al. |
| 8,340,445 | B2 | 12/2012 | Yamaguchi et al. |
| 8,878,956 | B2 * | 11/2014 | Suzuki ................... H04N 5/772 348/223.1 |
| 9,396,557 | B2 | 7/2016 | Yang et al. |
| 10,904,436 | B2 | 1/2021 | Heo et al. |
| 2005/0111742 | A1 * | 5/2005 | Seo ........................ H04N 19/60 375/E7.14 |
| 2019/0373189 | A1 | 12/2019 | Lee |
| 2019/0378306 | A1 | 12/2019 | Hashimoto et al. |
| 2020/0036983 | A1 * | 1/2020 | Wang ................... H04N 19/157 |
| 2020/0260028 | A1 * | 8/2020 | Lee ..................... H04N 25/683 |

FOREIGN PATENT DOCUMENTS

| | | |
|---|---|---|
| CN | 110557637 | 12/2019 |
| JP | H1198511 | 4/1999 |
| JP | 2002238054 | 8/2002 |
| JP | 2005333622 | 12/2005 |
| JP | 2008011211 | 1/2008 |
| JP | 2008178109 | 7/2008 |
| JP | 2010004514 | 1/2010 |
| JP | 6574655 | 9/2019 |
| KR | 10-0648127 | 11/2006 |
| KR | 10-0793920 | 1/2008 |

OTHER PUBLICATIONS

1st Office Action dated Sep. 3, 2024 in corresponding JP Patent Appln. No. 2021-116290.

* cited by examiner

FIG. 14

| MIPI MODE NAME | MODE NUMBER | HEADER | | | |
|---|---|---|---|---|---|
| AD MODE | MODE0 | 0 | 0 | 0 | 0 |
| | MODE1 | 0 | 0 | 0 | 1 |
| | MODE2 | 0 | 0 | 1 | 0 |
| | MODE3 | 0 | 0 | 1 | 1 |
| eMPD MODE | MODE8 | 1 | 0 | 0 | 0 |
| | MODE9 | 1 | 0 | 0 | 1 |
| | MODE10 | 1 | 0 | 1 | 0 |
| | MODE11 | 1 | 0 | 1 | 1 |
| eHVD MODE | MODE12 | 1 | 1 | 0 | 0 |
| | MODE13 | 1 | 1 | 0 | 1 |
| eHVA MODE | MODE14 | 1 | 1 | 1 | 0 |
| OD MODE | MODE4 | 0 | 1 | 0 | 0 |
| | MODE5 | 0 | 1 | 0 | 1 |
| eOUT MODE | MODE15 | 1 | 1 | 1 | 1 |
| OUT MODE | MODE7 | 0 | 1 | 1 | 1 |
| FNR MODE | MODE6 | 0 | 1 | 1 | 0 |

IMAGE SENSOR MODULE, IMAGE PROCESSING SYSTEM, AND IMAGE COMPRESSION METHOD

CROSS-REFERENCE TO RELATED APPLICATIONS

This application claims priority under 35 USC § 119 to Korean Patent Application No. 10-2020-0088452, filed on Jul. 16, 2020, and to Korean Patent Application No. 10-2021-0029045, filed on Mar. 4, 2021, each in the Korean Intellectual Property Office, the disclosures of which are incorporated by reference herein in their entireties.

FIELD

The present disclosure generally relates to image sensors, and more particularly relates to an image sensor module for compressing data in an isolated region, an image processing system, and an image compression method.

DISCUSSION OF RELATED ART

As interest in high quality and high-definition pictures, images, or the like is increased, the numbers of sensing pixels in pixel arrays of image sensors has increased, as well as sizes of image data generated by the image sensor. The image data may be transmitted to an image processing device, where the image data may be compressed to increase the transmission efficiency, and the compressed image data may be transmitted to the image processing device. The image data may include various image patterns in two dimensions or multiple dimensions. For compressing pixel data included in a particular region of the image pattern, a compression method in which the compression efficiency is increased and compression loss is reduced may be applied.

SUMMARY

The present disclosure provides an image sensor module for efficiently compressing pixel data of an isolated region, an image processing system, and an image compression method.

According to an embodiment of the present disclosure, there is provided an image compression method of compressing image data generated by an image sensor, including: receiving pixel values of a target pixel group of image data on which compression is to be performed, and reference values of reference pixels to be used in compression of the target pixel group; determining an averaging direction in which an averaging calculation is to be performed on target pixel values; averaging the pixel values of target pixels in the averaging direction; generating balance information including compensation values to be applied to the average values based on the reference pixels; and generating a bitstream based on the average values, the balance information, and compression information.

According to another embodiment of the present disclosure, there is provided an image sensor module including: an image sensor configured to generate image data including a plurality of pixels; an encoder configured to generate compressed data including a plurality of bitstreams by sequentially compressing the image data generated by the image sensor in units of pixel groups, and to compress the target pixel group to be compressed according to at least one encoding method of a plurality of encoding methods; and an interface configured to output the compressed data to an external image processing device, wherein the encoder, according to a first encoding method of the plurality of encoding methods, generates average values based on pixel values of the target pixels, generates balance information including compensation values to be applied to the average values, and generates a bitstream including the average values, the balance information, and compression information.

According to another embodiment of the present disclosure, there is provided an image processing system including: an image sensor configured to sense a received optical signal and generate image data; an encoder configured to sequentially compress a plurality of pixel groups of the image data and generate a plurality of bitstreams; and a decoder configured to de-compress the plurality of bitstreams and restore the image data, wherein the encoder generates balance information including average values based on pixel values of target pixels and compensation values to be applied to the average values, and generates a bitstream including the average values, the balance information, and compression information.

BRIEF DESCRIPTION OF THE DRAWINGS

Embodiments of the present disclosure will be more clearly understood from the following detailed description taken in conjunction with the accompanying drawings in which:

FIG. 14 is a tabular diagram describing compression information according to an embodiment;

DETAILED DESCRIPTION

Hereinafter, embodiments of the present disclosure will be described in detail with reference to the accompanying drawings.

Figure 1:
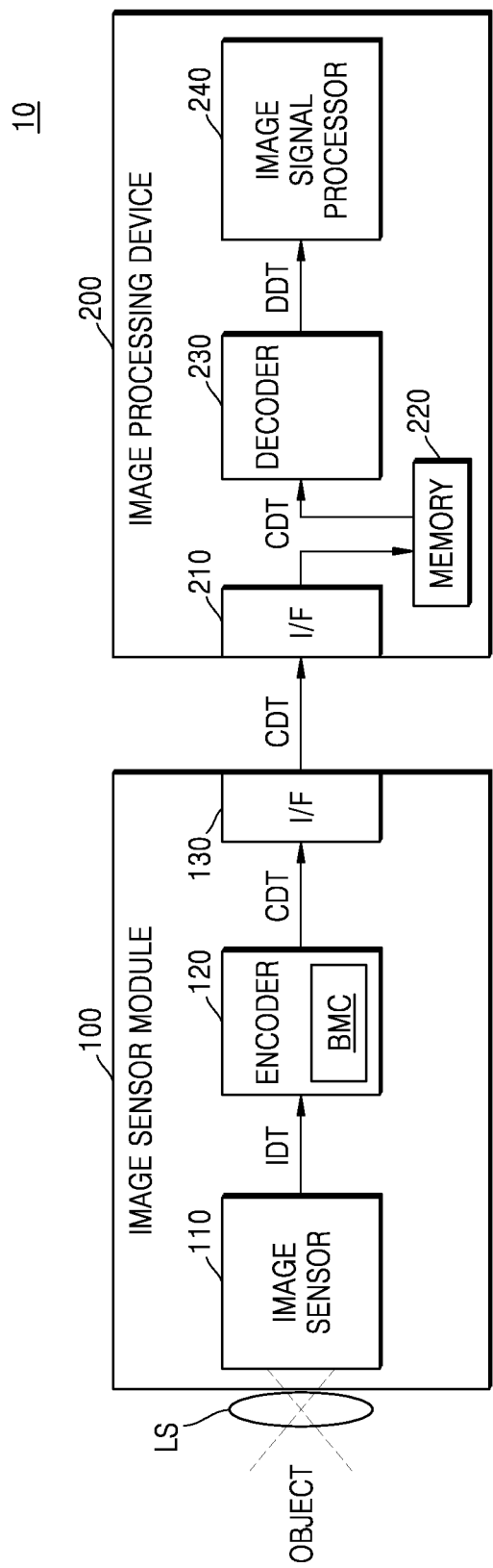
FIG. 1 is a block diagram of an image processing system according to an embodiment.
Figure 2:
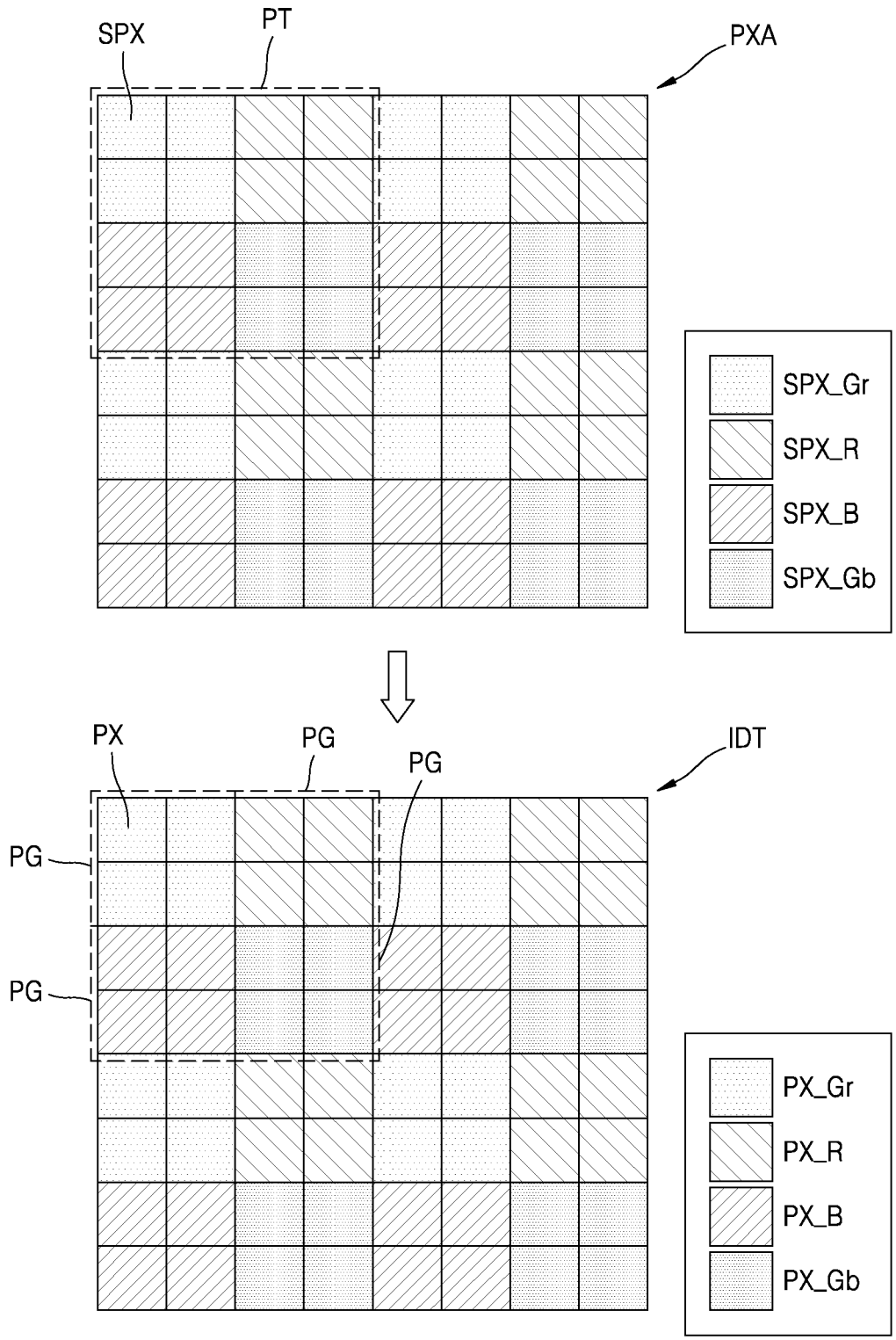
FIG. 2 is a hybrid conceptual diagram of a pixel array and image data applied to an image sensor module according to an embodiment.

FIG. 1 illustrates an image processing system 10, according to an embodiment. FIG. 2 illustrates a pixel array and image data applied to an image sensor module, according to an embodiment.

The image processing system 10 may sense an image of an object or subject, store the sensed image to a memory and/or process the sensed image and, and may store the processed image in the memory. According to an embodiment, the image processing system 10 may be implemented as a digital camera, a digital camcorder, a mobile phone, a tablet computer, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like. In addition, the image processing system 10 may be mounted as a component in electronic equipment, such as a drone, an advanced drivers assistance system (ADAS), vehicles, furniture, manufacturing facilities, doors, various measurement equipment, or the like.

Referring to FIG. 1, the image processing system 10 may include an image sensor module 100 and an image processing device 200. In an embodiment, the image sensor module 100 may include an image sensor 110, an encoder 120, and an interface (I/F) 130. In an embodiment, the image sensor module 100 may be implemented as a plurality of semiconductor chips. For example, a pixel array (e.g., PXA in FIG. 2) of the image sensor 110 may be integrated into one semiconductor chip, or may be integrated into other semiconductor chips in which logic circuits of the image sensor 110, the encoder 120, and the I/F 130 are different, and the plurality of semiconductor chips may be electrically connected to each other via connecting members or may be electrically connected to each other via through vias where stacked. However, embodiments are not limited thereto, and the image sensor module 100 may be implemented as a single semiconductor chip without limitation thereto.

In an embodiment, the image processing device 200 may include an I/F 210, a memory 220, a decoder 230, and an image signal processor 240.

The image sensor module 100 may shoot an external target, object or subject, and generate image data IDT. The image sensor module 100 may include the image sensor 110 capable of converting an optical signal of the target incident through a lens LS to an electrical signal.

The image sensor 110 may include the pixel array (e.g., PXA in FIG. 2) in which a plurality of sensing pixels (e.g., SPX in FIG. 2) are arranged two-dimensionally, and may output the image data IDT including a plurality of pixel values respectively corresponding to the plurality of sensing pixels SPX of the pixel array PXA.

The pixel array PXA may include a plurality of row lines, a plurality of column lines, and a plurality of sensing pixels SPX that are connected to each of the plurality of row lines and each of the plurality of column lines and are arranged in a matrix form.

Each of the plurality of sensing pixels SPX of the pixel array PXA may sense an optical signal of at least one color of a plurality of reference colors. For example, the plurality of reference colors may include red color, green color, and blue color, or red color, green color, blue color, and white color, and may also include colors other than these colors. For example, the plurality of reference colors may include cyan color, yellow color, green color, and magenta color. The pixel array PXA may generate pixel signals including information about the reference color of each of the plurality of sensing pixels SPX.

For example, as illustrated in FIG. 2, the pixel array PXA may include a red sensing pixel SPX_R, a blue sensing pixel SPX_B, and first and second green sensing pixels SPX_Gr and SPX_Gb. A green sensing pixel arranged in the same row as the red sensing pixel SPX_R may be referred to as the first green sensing pixel SPX_Gr, and a green sensing pixel arranged in the same row as the blue sensing pixel SPX_B may be referred to as the second green sensing pixel SPX_Gb.

The red sensing pixels SPX_R, the blue sensing pixels SPX_B, the first green sensing pixels SPX_Gr, and the second green sensing pixels SPX_Gb may be arranged in rows and columns, and this arrangement may be referred to as a pixel pattern PT. A plurality of pixel patterns PT may be repeatedly arranged in the pixel array PXA.

For example, as illustrated in FIG. 2, the pixel pattern PT may include the red sensing pixels SPX_R arranged in a 2×2 matrix, the blue sensing pixels SPX_B arranged in a 2×2 matrix, the first green sensing pixels SPX_Gr arranged in a 2×2 matrix, and the second green sensing pixels SPX_Gb arranged in a 2×2 matrix. This type of pixel pattern PT may be referred to as a tetra pattern. However, the technical idea of the present disclosure is not limited thereto, and the pixel pattern PT may include the red sensing pixel SPX_R, the blue sensing pixel SPX_B, the first green sensing pixel SPX_Gr, and the second green sensing pixel SPX_Gb, which are arranged in a 2×2 matrix, and this type of pixel pattern PT may be referred to as a Bayer pattern (see, e.g., FIG. 9). Alternatively, the pixel pattern PT may include the red sensing pixels SPX_R arranged in an n×n (where n is an integer equal to or greater than 3) matrix, the blue sensing pixels SPX_B arranged in an n×n matrix, the first green sensing pixels SPX_Gr arranged in an n×n matrix, and the second green sensing pixels SPX_Gb arranged in an n×n matrix.

The image data IDT may be generated based on the pixel signals output by the pixel array PXA. The image data IDT may have a color pattern corresponding to the pixel pattern PT of the pixel array PXA. As an example, when the pixel array PXA has a Bayer pattern, the image data IDT may also have a Bayer pattern. As another example, when the pixel array PXA has a tetra pattern, the image data IDT may have either the tetra pattern or the Bayer pattern.

For example, when the pixel array PXA has a tetra pattern, one pixel signal may be output from four sensing pixels SPX of the same color included in the pixel pattern PT, or four pixel signals may be output as the pixel signal is output from each of the four sensing pixels SPX. When one pixel signal is output, the image data IDT may have a Bayer pattern, and when four pixel signals are output, as illustrated in FIG. 2, the image data IDT may have a tetra pattern.

The image data IDT may include a read pixel PX_R, a blue pixel PX_B, a first green pixel PX_Gr, and a second green pixel PX_Gb, which are alternately arranged. A pixel PX of the image data IDT may indicate data corresponding to the sensing pixel SPX of the pixel array PXA, that is, pixel data. The read pixel PX_R, the blue pixel PX_B, the first green pixel PX_Gr, and the second green pixel PX_Gb may correspond to the red sensing pixel SPX_R, the blue sensing pixel SPX_B, the first green sensing pixel SPX_Gr, the second green sensing pixel SPX_Gb, respectively.

The image data IDT may include a plurality of pixel groups PG, and in this case, according to the color pattern PT of the image data IDT, the pixel group PG may be set to include a preset number of pixels PX arranged sequentially in rows and columns or arranged in one direction, or to include adjacent pixels PX to each other corresponding to the same reference color.

For example, as illustrated in FIG. 2, when the image data IDT has a tetra pattern, the pixel group PG may be set to correspond to the same reference color (for example, red, blue, and green colors, or the like) and include four pixels PX adjacent to each other. As another example, when the image data IDT has a Bayer pattern, the pixel group PG may be set to include a preset number (for example, four) different color pixels PX arranged in a matrix.

Referring to FIG. 1 again, each of the plurality of sensing pixels SPX may include at least one photo-sensing element or photoelectric conversion element. The photo-sensing element may sense light, and convert the sensed light to an electrical signal. For example, the photo-sensing element may include a photodiode, a photo transistor, a photo gate, a pinned photodiode (PPD), or a combination thereof.

Each of the plurality of sensing pixels SPX may include the photo-sensing element and a pixel circuit for outputting the pixel signal corresponding to an electrical signal generated by the photo-sensing element. For example, the pixel circuit may have a four-transistor structure including a transmission transistor, a reset transistor, an amplification transistor, and a select transistor. However, embodiments are not limited thereto, and the pixel circuit may have a one-transistor structure, a three-transistor structure, the four-transistor structure, a five-transistor structure, or a structure in which the plurality of pixels PX share some transistors. In an embodiment, each of the pixel circuits may be equipped with a memory and/or an analog-digital converter.

In an embodiment, a plurality of color filters transmitting an optical signal (e.g., an optical signal of a particular color) of a particular wavelength band may be arranged on the plurality of pixels PX to respectively correspond to the plurality of pixels PX of the pixel array PXA, and may convert the optical signal transmitted through a color filter corresponding to at least one photo-sensing element equipped in the pixel PX. Accordingly, each of the plurality of sensing pixels SPX may output at least one pixel signal corresponding to allocated at least one reference color. However, embodiments are not limited thereto. For example, an optical signal of a particular wavelength band of light incident on at least one photo-sensing element equipped in the sensing pixel SPX may be selectively converted to an electrical signal.

In an embodiment, the image data IDT may include raw image data including the plurality of pixel values in which the plurality of pixel signals output by the pixel array PXA have been digital-analog converted, or image data in which a pre-processing operation has been performed on the raw image data.

For a data transmission speed, power consumption reduction according to data transmission, and the efficiency of data storage space, the image sensor module 100 may compress the image data IDT by using the encoder 120, and transmit the compressed data CDT to the image processing device 200.

The encoder 120 may receive the image data IDT from the image sensor 110, compress the image data IDT, and generate the compressed data CDT. The compressed data CDT may be implemented in an encoded bitstream form. Hereinafter, the encoded bitstream may be simply referred to as a bitstream. The bitstream may include a compression result and compression information (for example, mode information indicating a compression method).

The encoder 120 may generate the compressed data CDT by encoding the image data IDT in units of pixel groups PG. The encoder 120 may generate one bitstream by encoding one pixel group PG, and generate the compressed data CDT based on the bitstream of all pixel groups PG in the image data IDT. As the pixel group PG is encoded, the pixel group PG may be compressed, and hereinafter, in the present disclosure, encoding may be used in the same sense as compression.

The encoder 120 may perform the compression by using a reference map generated based on the pixel values corresponding to the pixels PX that have been previously compressed ahead of the pixel group PG to which the compression is to be performed, that is, a target pixel group. The encoder 120 may compress the pixel value of a target pixel based on a reference value of at least one reference pixel adjacent to at least one target pixel in the target pixel group in the reference map. The reference value may be generated based on the pixel value of the reference pixel, and for example, the reference value may be a value that is generated as the pixel value of the reference pixel is compressed and de-compressed.

There is a possibility that the pixel value of the target pixel may have a similar value to the pixel value of the adjacent reference pixel. In addition, there is a possibility that the pixel values of the target pixels in the target pixel group may have similar values to each other. Accordingly, the encoder 120 may compress the target pixel group by using an encoding method based on differential pulse code modulation (DPCM) in which an encoding operation is performed based on a difference between the target pixels of the target pixel group from neighboring pixels, such as, for example, a difference value between the pixel value of the target pixel and the reference value of the reference pixel, or a difference value between the pixel value of the target pixel and the pixel value of other target pixel group. Accordingly, the compression efficiency or compression rate may be increased, and thus, data loss due to the compression may be reduced.

The difference between the pixel values of pixels of the target pixel group included in an isolated region in the image data IDT and the pixel values of the reference pixels may be large. In other words, correlation between the pixel values of the target pixels and the reference values of the reference pixels may be low.

In this case, the isolated region may indicate a region corresponding to a periphery region in at least two directions (for example, two directions orthogonal to each other) of periphery regions of a two-dimensional or multi-dimensional image pattern generated in the image data IDT, such as, for example, a region corresponding to edges of the image pattern.

The encoder 120 according to an embodiment may include a balance mode compressor BMC, and when differences between the pixel values of the target pixels and the reference values of the reference pixels are large, the balance mode compressor BMC may compress the target pixels by using a dedicated encoding method, such as, for example, a horizontal or vertical (HV) balance encoding method. The balance mode compressor BMC may generate average values by averaging the pixel values of the target pixels in a horizontal or longitudinal direction, or in a vertical or transverse direction, and generate the bitstream based on the average values and balance information. In this case, the balance information may include information for compensating a difference between the average value and the pixel value, and may include a select value indicating whether the pixel values are to be restored by applying a difference value between the reference values of the neighboring pixels to the average value as a compensation value during the encoding operation, and a slope value indicating whether to add or deduct a difference value or a preset default value to or from the average value with respect to a certain pixel. This HV balance encoding method may be described in greater detail with reference to FIGS. 5 through 10.

When the encoder 130 compresses a pixel group in an isolated region by using the above-described DPCM method, or compresses according to a method of encoding the pixel group in the isolated region based on some high data bits including the most significant bit (MSB) of the plurality of data bits indicating the pixel value of each of the target pixels, a large amount of data loss may occur. Accordingly, image deterioration may occur in restored image data that has been generated by de-compressing the compressed data CDT, and artifacts may occur in the image data. However, as described above, the encoder 120 according to an embodiment may compress the pixel group in the isolated region by using a dedicated encoding method, for example, the HV balance encoding method. Accordingly, the compression efficiency may be increased, and the data loss may be reduced.

The encoder 120 may provide the compressed data CDT to the image processing device 200 via the I/F 130. For example, the I/F 130 may be implemented as a camera serial interface (CSI) based on a mobile industry processor interface (MIPI). However, a type of the I/F 130 is not limited thereto, and may be implemented according to various protocol standards.

The image processing device 200 may generate an image to be displayed on a display by converting the compressed data CDT received from the image sensor module 100. The image processing device 200 may receive the compressed data CDT from the image sensor module 100, generate de-compressed data DDT, such as, for example, restored image data, by de-compressing the compressed data CDT, and perform an image processing operation on the de-compressed data DDT.

In an embodiment, the image processing device 200 may receive the compressed data CDT from the image sensor module 100 via the I/F 210. The I/F 210 may be implemented with MIPI as the I/F 130 equipped in the image sensor module 100, but is not limited thereto. The image processing device 200 may store the received compressed data CDT to the memory 220.

The memory 220 may be a storage location for storing data. The compressed data CDT may be stored in the memory 220. In addition, the memory 220 may store other data, such as, for example, an operating system (OS), various programs, and various data (for example, compressed data CDT). The memory 220 may include a volatile memory, such as random-access memory (RAM), dynamic random-access memory (DRAM) and/or static RAM (SRAM), or a non-volatile memory, such as phase change RAM (PRAM), resistive RAM (ReRAM), magnetic RAM (MRAM), and/or flash memory. In FIG. 1, the memory 220 is illustrated to be included in the image processing device 200, but is not limited thereto, and the memory 220 may be provided separately outside of the image processing device 200.

The decoder 230 may read the compressed data CDT from the memory 220, and generate the de-compressed data DDT by de-compressing the compressed data CDT. The decoder 230 may provide the de-compressed data DDT to the image signal processor 240.

The decoder 230 may de-compress the compressed data CDT in units of pixel groups PG by using a de-compression method or decoding method according to a compression method or encoding method performed by the encoder 120 of the image sensor module 100. The decoder 230 may determine the de-compression method applied to the pixel group PG based on compression information included in the bitstream of the compressed data CDT. The decoder 230 may de-compress the target pixels of the target pixel group based on pixels that have been de-compressed ahead of the target pixel group to be de-compressed, that is, the reference map including the reference values corresponding to the reference pixels.

In an embodiment, the decoder 230 may de-compress the target pixel group by using a decoding method according to the HV balance encoding method. The decoder 230 may store the pixel values by adjusting the average value included in the bitstream based on the balance information.

The image signal processor 240 may perform various image processing operations on the received de-compressed data DDT. As a non-limiting example, the image signal processor 240 may perform at least one image processing operation of bad pixel compensation, offset compensation, lens distortion compensation, color gain compensation, shading compensation, gamma compensation, denoising, and/or sharpening on the de-compressed data DDT. In an embodiment, according to the performance of the image sensor module 100, some of the above-described image processing operations may be omitted. For example, when the image sensor module 100 includes the image sensor 110 of high quality, the bad pixel compensation (e.g., static bad pixel compensation) or the offset compensation or the like of the image processing operations may be omitted.

On the other hand, each of the encoder 120 and the decoder 230 may be implemented as software or hardware, or a combination of software and hardware such as firmware. When the encoder 120 and the decoder 230 are implemented as software, each of above-described functions may be implemented as programmed source code and be loaded on a storage medium equipped in each of the image sensor module 100 and the image processing device 200, and as a processor (for example, an image processor) equipped in each of the image sensor module 100 and the image processing device 200 executes software, functions of the encoder 120 and the decoder 230 may be implemented. When the encoder 120 and the decoder 230 are implemented as hardware, the encoder 120 and the decoder 230 may include a logic circuit and a register, and each of the above-described functions may be performed based on a register setting.

In FIG. 1, the image processing system 10 is illustrated to include the image sensor module 100 and the image processing device 200, but embodiments are not limited thereto. For example, the image processing system 10 may include some of the image sensor module 100 and the image processing device 200, or may be implemented to include a plurality of image sensor modules 100. In addition, in FIG. 1, the decoder 230 and the image signal processor 240 are illustrated as separate components, but embodiments are not limited thereto. For example, the image signal processor 240 may be implemented to include the decoder 230.

Figure 3A:
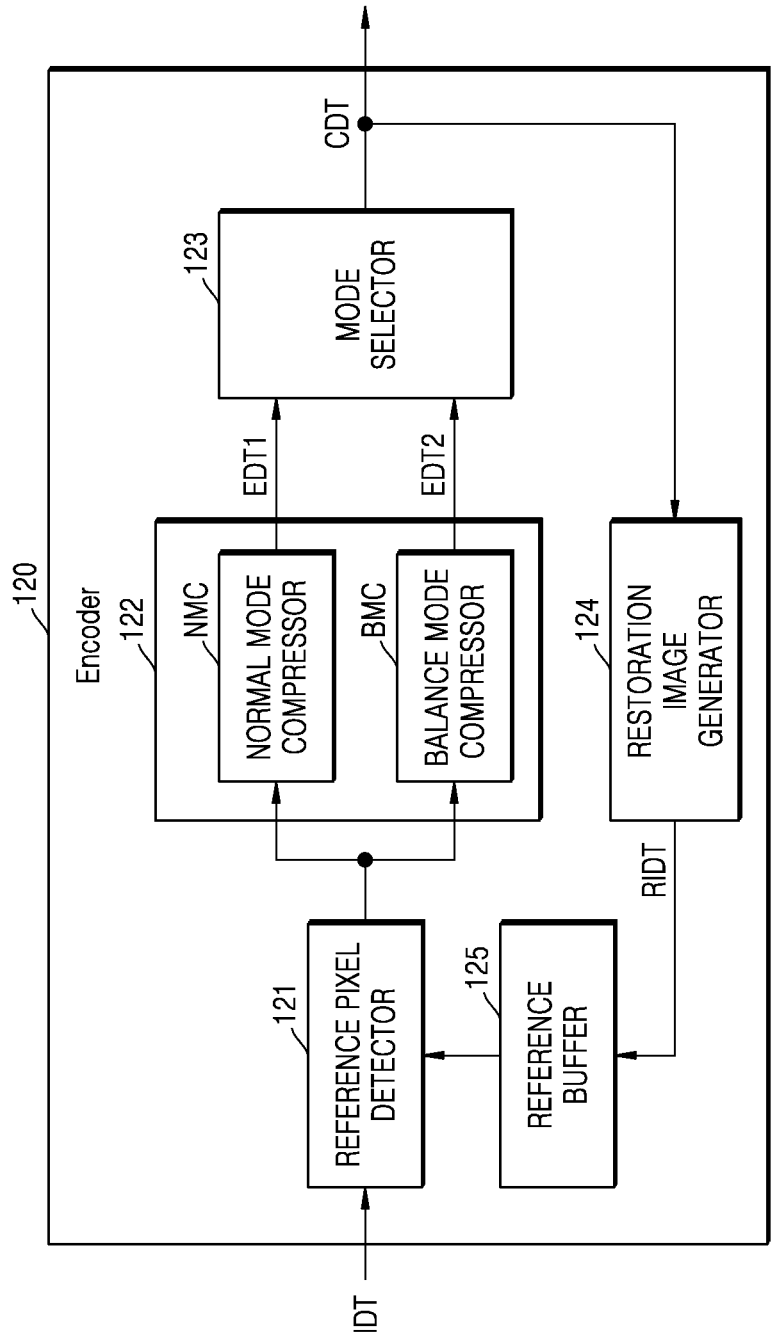
FIG. 3A is a block diagram of an encoder according to an embodiment.
Figure 3B:
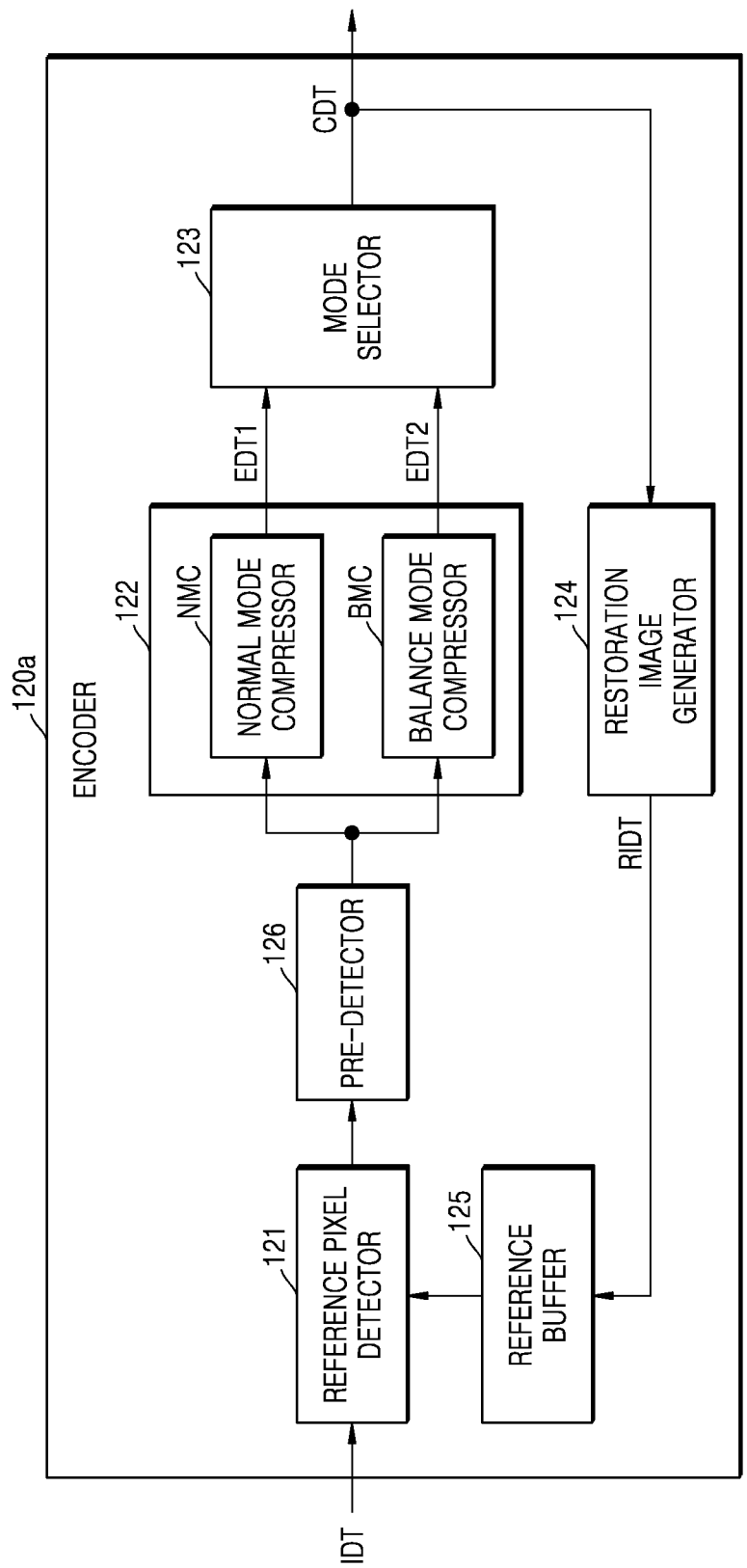
FIG. 3B is a block diagram of an encoder according to an embodiment.

FIGS. 3A and 3B illustrate encoders according to embodiments. FIGS. 3A and 3B illustrates examples of the encoder 120 in FIG. 1.

Referring to FIGS. 1 and 3A, the encoder 120 may include a reference pixel detector 121, a compression circuit 122, a mode selector 123, a restoration image generator 124, and a reference buffer 125.

The reference pixel detector 121 may receive the image data IDT from the image sensor (e.g., 110 in FIG. 1), and receive from the reference buffer 125 the reference map including the reference values of the reference pixels that are used for compressing the target pixel group. The reference pixel detector 121 may detect the reference value of the reference pixels adjacent to the target pixel group in the restored image data stored in the reference buffer 125, that is, the restored pixel values of the reference pixels, and may receive the reference values from the reference buffer 125 as the reference map. The reference pixel detector 121 may provide the target pixel group and the reference map of the image data IDT to the compression circuit 122.

The compression circuit 122 may compress the target pixel group based on the reference map. The compression circuit 122 may include the balance mode compressor BMC and a normal mode compressor NMC, and the balance mode compressor BMC and the normal mode compressor NMC may compress the target pixel group by using different compression methods or encoding methods from each other. The normal mode compressor NMC may output first encoding data EDT1, and the balance mode compressor BMC may output second encoding data EDT2.

The normal mode compressor NMC may encode the target pixel group in the DPCM method based on the reference map. In an embodiment, the normal mode compressor NMC may generate a difference between the reference value of the reference pixel and the pixel value of the target pixel, and difference values between the pixel values of the target pixels, and may generate the bitstream based on the difference values. In an embodiment, the normal mode compressor NMC may generate a difference value between the average value of pixel values of the target pixels and a reference value of the reference pixel, and difference values between the average value and the pixel values of the target pixels, and may generate the bitstream based on the difference values. The bitstream generated in the normal mode compressor NMC may be output as the first encoding data EDT1.

The balance mode compressor BMC may encode the target pixel group in the HV balance encoding method as described above with reference to FIG. 1. As described above with reference to FIG. 1, the average values may be generated by averaging the pixel values of the target pixels in a longitudinal direction or a vertical direction, and the bitstream may be generated based on the balance information for compensating a difference between the average value of the average values and the pixel value. The bitstream generated by the balance mode compressor BMC may be output as the second encoding data EDT2.

In this case, the balance mode compressor BMC may determine whether to average the pixel values of the target pixels continuously arranged up and down or whether to average the pixel values of the target pixels continuously arranged left and right, that is, a direction in which an averaging calculation is to be performed. The balance mode compressor BMC may determine the direction in which the averaging calculation is to be performed based on the reference values of the reference map.

In FIG. 3A, the compression circuit 122 is illustrated to include the balance mode compressor BMC and the normal mode compressor NMC, but embodiments are not limited thereto, and the compression circuit 122 may further include a compressor encoding the target pixel group by using a different encoding method from those of the balance mode compressor BMC and/or the normal mode compressor NMC.

The mode selector 123 may select compressed data received from the compression circuit 122, for example, one of the first encoding data EDT1 and the second encoding data EDT2, and may output the selected encoding data as the compressed data CDT.

The mode selector 123 may decode the first encoding data EDT1 and the second encoding data EDT2 in a decoding method according to a method of decoding each of them, and may select one of the first encoding data EDT1 and the second encoding data EDT2 based on an error rate according to the decoding. The error rate may indicate a difference between the decoded data, that is, the decoded pixel values and the pixel values before the decoding, and as the difference is less, the error rate may be lower. As the error rate is lower, the de-compressed data DDT generated by the image processing device 200, that is, the image deterioration of the restored image data, may be less. Thus, the mode selector 123 may select encoding data having a lower error rate among the first encoding data EDT1 and the second encoding data EDT2 as the compressed data CDT, and may output the compressed data CDT.

In an embodiment, the normal mode compressor NMC or another separate compressor may generate encoded data by encoding the target pixel group, for example, the first encoding data EDT1, and when the error rate of the first encoding data EDT1 exceeds a reference error rate, the balance mode compressor BMC may operate. The balance mode compressor BMC may generate the second encoding data EDT2 by encoding the target pixel group. When an error rate of the first encoding data EDT1 is equal to or less than the reference error rate, the mode selector 123 may output the first encoding data EDT1 as the compressed data CDT. When the error rate of the first encoding data EDT1 exceeds the reference error rate, the mode selector 123 may output the second encoding data EDT2 received from the balance mode compressor BMC as the compressed data CDT.

The restoration image generator 124 may generate restored image by decoding the compressed data CDT as data. The restoration image generator 124 may restore the pixel values of the target pixel group by decoding in a decoding method corresponding to the encoding method of each of the plurality of bitstreams included in the compressed data CDT. The pixels corresponding to the restored pixel values may be used as the reference pixels of the other target pixel group to which the compression is to be performed.

The reference buffer 125 may store the restored image data, and provide the reference value of the reference pixels used for compressing the target pixel group to the reference pixel detector 121. In an embodiment, the reference buffer 125 may include a line memory, and store the reference pixels around the target pixels of the target pixel group. In an embodiment, the reference buffer 125 may be implemented as a volatile memory, such as DRAM and SRAM. However, embodiments are not limited thereto, and the reference buffer 125 may be implemented as a non-volatile memory, such as ReRAM and PRAM.

Referring to FIG. 3B, an encoder 120a may include the reference pixel detector 121, a pre-detector 126, the compression circuit 122, the mode selector 123, the restoration image generator 124, and the reference buffer 125. Compared with the encoder 120 of FIG. 3A, the encoder 120a may further include the pre-detector 126. Operations of the reference pixel detector 121, the compression circuit 122, the mode selector 123, the restoration image generator 124, and the reference buffer 125 have been described with reference to FIG. 3A, and duplicate descriptions thereof are omitted.

The pre-detector 126 may activate or deactivate the balance mode compressor BMC. In an embodiment, the pre-detector 126 may activate or deactivate the balance mode compressor BMC based on the reference value of the reference pixels. For example, when a difference between the reference values and the pixel value of the target pixel is equal to or greater than a threshold value or a particular code value, the balance mode compressor BMC may be activated, and when less than the threshold value, the balance mode compressor BMC may be deactivated. In an embodiment, the pre-detector 126 may include a register, and may activate or deactivate the balance mode compressor BMC based on a control signal stored in the register. For example, the control signal may be received from the image processing device 200.

When the balance mode compressor BMC is deactivated, another compressor equipped in the compression circuit 122, for example, the normal mode compressor NMC, may encode the target pixel group, and the encoded data, for example, the first encoding data EDT1 may be output as the compressed data CDT.

When the balance mode compressor BMC is activated, at least some of a compressor and the balance mode compressor BMC equipped in the compression circuit 122 may each encode the target pixel group, and the mode selector 123 may output the encoded data having the lowest error rate of encoded data as the compressed data CDT.

In an embodiment, although the balance mode compressor BMC is activated, a priority of the balance mode compressor BMC of compressors equipped in the compression circuit 122 may be low. For example, the normal mode compressor NMC may encode first the target pixel group to generate the first encoding data EDT1, and when an error rate of the first encoding data EDT1 exceeds the reference error rate, the balance mode compressor BMC may operate. The balance mode compressor BMC may generate the second encoding data EDT2 by encoding the target pixel group. When an error rate of the first encoding data EDT1 is equal to or less than the reference error rate, the mode selector 123 may output the first encoding data EDT1 as the compressed data CDT. When the error rate of the first encoding data EDT1 exceeds the reference error rate, the mode selector 123 may output the second encoding data EDT2 received from the balance mode compressor BMC as the compressed data CDT.

In an embodiment, when the balance mode compressor BMC is activated, another compressor equipped in the compression circuit 122, for example, the normal mode compressor NMC, may be deactivated, and the second encoding data EDT2 generated by the balance mode compressor BMC may be output as the compressed data CDT. Accordingly, power consumption of the encoder 120a may be reduced.

Figure 4:
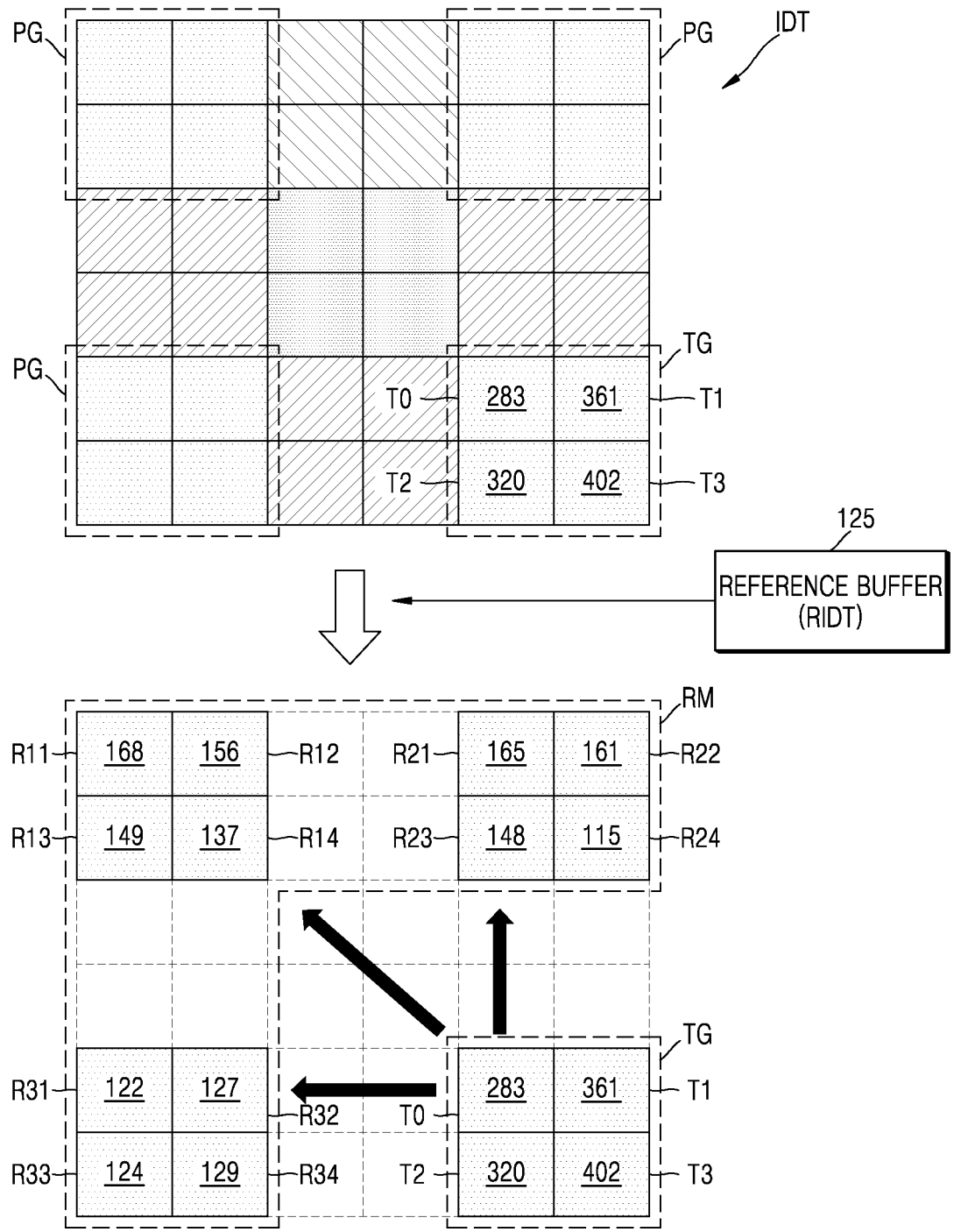
FIG. 4 is a hybrid conceptual diagram of a reference map according to an embodiment.

FIG. 4 illustrates a reference map according to an embodiment. In FIG. 4, the reference indicia for pixels are alphanumeric beginning with a letter. In this embodiment, the three-digit number associated with a pixel indicates a value of that pixel, in other words, the pixel value or the reference value. For example, the pixel indicated as T0 has a value of 283.

Referring to FIG. 4, the image data IDT may include the plurality of pixel groups PG, and may be compressed sequentially in a direction in which the plurality of pixel groups PG are set. In an embodiment, the image data IDT may be compressed in a left to right direction and in an up to down direction, sequentially, and in units of pixel groups PG. However, embodiments are not limited thereto, and the image data IDT may be compressed in a right to left direction or in down to up direction.

Compression may be performed on a target pixel group TG, or on target pixels T0, T1, T2, and T3 of the target pixel group TG. The target pixel group TG may be compressed based on pixels included in the pixel groups PG corresponding to the same color of neighboring pixel groups PG on which compression has been performed. A neighboring pixel used for compressing the target pixel group TG may be referred to as the reference pixel.

The reference values of the reference pixels adjacent to the target pixel group TG of restored image data RIDT from the reference buffer 125 may be generated as a reference map RM. In this case, the reference value may indicate a value generated after the pixel value is compressed and de-compressed. For example, the reference map RM may include the reference values of the reference pixels (for example, R11, R12, R13, R14, R21, R22, R23, R24, R31, R32, R33, and R34).

The target pixel group TG may be compressed based on the reference map RM. For example, the target pixel group TG or the target pixel T0 of the target pixel group TG may be encoded based on the reference value having a relatively highest correlation of the reference values of adjacent reference pixels R13, R14, R23, R24, R32, and R34, or a reference value of the adjacent reference pixel in a preset direction.

Differences between the pixel values of the target pixels T0, T1, T2, and T3 of the target pixel group TG may be large. For example, when the pixel value of the target pixel T0 is 283, reference values of adjacent reference pixels R14, R23, and R32 are 137, 148, and 127, respectively, and the threshold value is set as 125, difference values between the pixel value and the reference values may be equal to or greater than 125, the target pixel group TG may correspond to an isolated region. In this manner, when the target pixel group TG corresponds to the isolated region, the target pixel group TG may be compressed based on the HV balance encoding method. For example, the balance mode compressor BMC in FIG. 3 may compress the target pixel group TG in the HV balance encoding method, and in this case, the balance mode compressor BMC may use neighboring pixels of the target pixel group TG.

Figure 5:
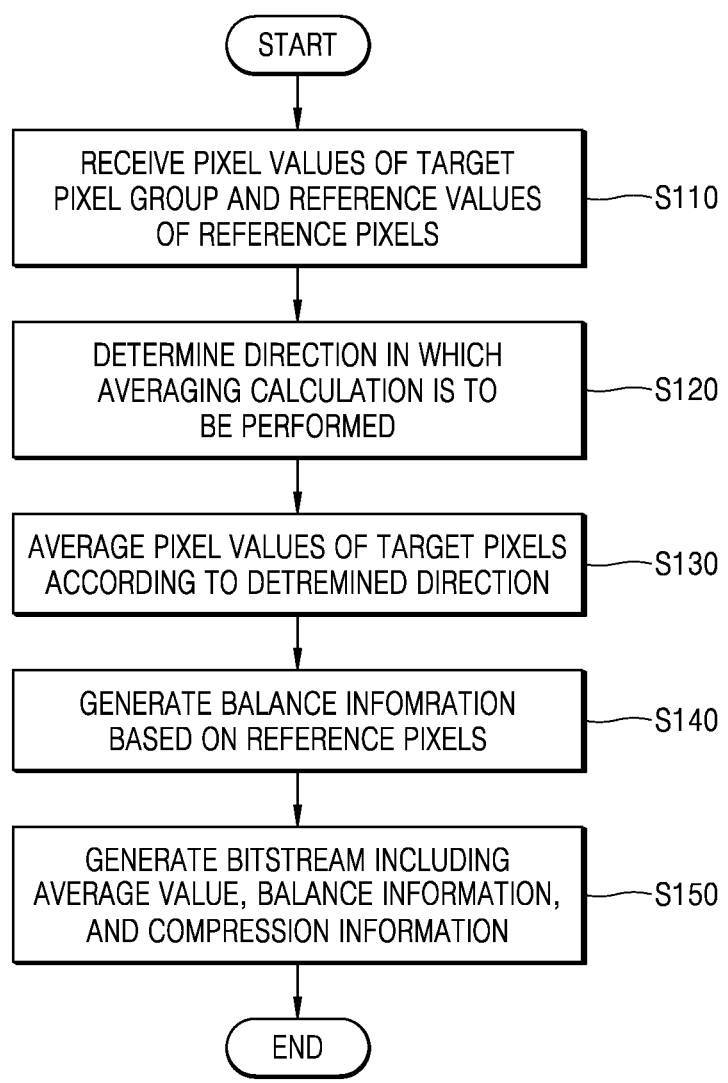
FIG. 5 is a flowchart diagram of a compression method according to an embodiment.

FIG. 5 illustrates a compression method, according to an embodiment, and FIGS. 6A, 6B, 6C, and 6D illustrate operations of the compression method of FIG. 5.

The compression method of FIGS. 5 and 6A-D may be performed by the balance mode compressor BMC in FIGS. 3A and 3B.

The pixel values of the target pixels T0, T1, T2, and T3 may be similar to each other. The balance mode compressor BMC may compress the target pixels T0, T1, T2, and T3 according to the HV balance mode encoding method by using similarity of the pixel values of the target pixels T0, T1, T2, and T3, and in this case, at least one pixel group of the pixel groups included in the reference map (e.g., RM in FIG. 4) may be used.

Assuming that the balance mode compressor BMC compresses the target pixel group TG by using the reference pixels R31, R32, R33, and R34 of the pixel group closest to the left side of the target pixel group TG of the pixel groups of the reference map RM, the compression method according to an embodiment is described. Embodiments are not limited thereto.

Referring to FIG. 5, the balance mode compressor BMC may receive the pixel values of the target pixel group and the reference pixel values of the reference pixels (S110). In other words, the balance mode compressor BMC may receive the image data IDT including the target pixel group TG and the reference map RM including the reference values of the reference pixels. The target pixel group TG, as the pixel group on which the compression is to be performed, may include target pixels T0, T1, T2, and T3, and may receive the pixel value of each of the target pixels T0, T1, T2, and T3. The reference pixels may include neighboring pixels of the target pixels used for compressing the target pixel group. The pixel values of the neighboring pixels may be compressed, and then restored and generated as the reference values.

Figure 6A:
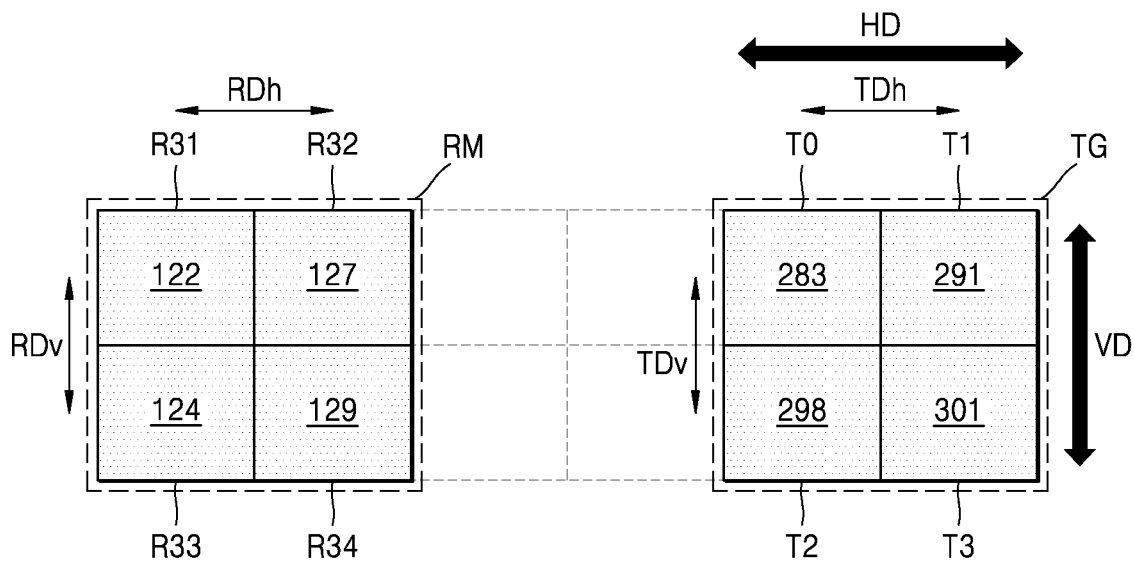
FIG. 6A is a conceptual diagram describing an operation of the compression method of FIG. 5.

The balance mode compressor BMC may determine a direction in which the averaging calculation is to be performed according to the HV balance mode encoding method (hereinafter referred to as an averaging direction) (S120). Referring to FIG. 6A, the balance mode compressor BMC may determine whether the averaging calculation is to be performed in a horizontal direction HD or a vertical direction VD.

In an embodiment, the balance mode compressor BMC may determine the averaging direction based on the reference pixels R31, R32, R33, and R34. For example, when a difference value RDh of the reference pixels in the horizontal direction HD (for example, a difference value between the reference values of the reference pixels R31 and R32) is equal to or less than a difference value RDv of the reference pixels in the vertical direction VD (for example, a difference value between the reference values of the reference pixels R33 and R34), the balance mode compressor BMC may determine the horizontal direction HD as the averaging direction. To the contrary, when the difference value RDh in the horizontal direction HD is greater than the difference value RDv in the vertical direction VD, the balance mode compressor BMC may determine the vertical direction VD as the averaging direction. As another example, when a difference value, between the difference value RDh of the reference pixels in the horizontal direction HD and a difference value TDh of the target pixels in the horizontal direction HD (for example, a difference value between the pixel values of the target pixels T0 and T1), for example, an absolute value of (RDh−TDh), is equal to or less than a difference value, between the difference value RDv of the reference pixels in the vertical direction HV and a difference value TDv of the target pixels in the vertical direction HV (for example, a difference value between the pixel values of the target pixels T0 and T3), for example, an absolute value of (RDv−TDv), the balance mode compressor BMC may determine the horizontal direction HD as the averaging direction, and in the opposite case, may determine the vertical direction VD as the averaging direction. However, embodiments are not limited thereto, and the balance mode compressor BMC may determine the averaging direction in various methods. In an embodiment, the balance mode compressor BMC may determine a preset direction as the averaging direction.

Referring to FIG. 5 again, the balance mode compressor BMC may average the pixel value of the target pixels according to the determined averaging direction (S130).

Figure 6B:
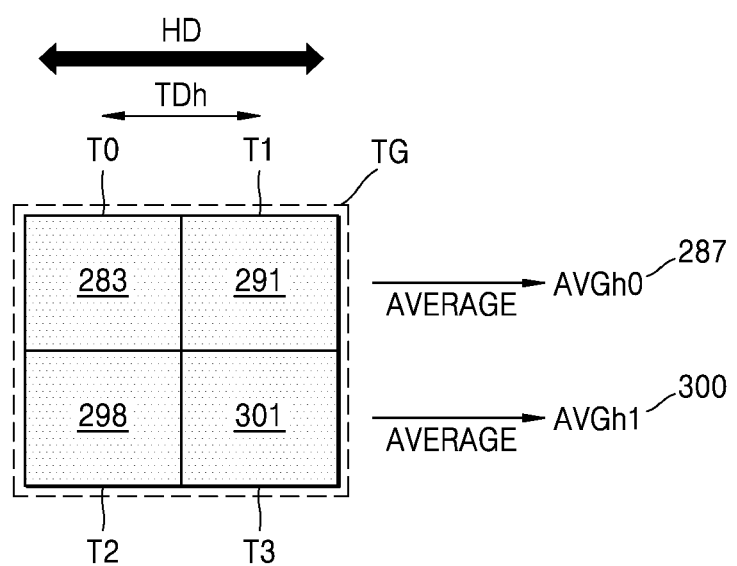
FIG. 6B is a conceptual diagram describing an operation of the compression method of FIG. 5.

As illustrated in FIG. 6B, when the horizontal direction HD is determined as the averaging direction, the balance mode compressor BMC may average the pixel values of the target pixels T0 and T1, and the pixel values of the target pixels T2 and T3. Accordingly, an average value AVGh0 of the target pixels T0 and T1, which is 287 (=(283+291)/2), and an average value AVGh1 of the target pixels T2 and T3, which is 300 (≈(298+301)/2), may be calculated.

Figure 6C:
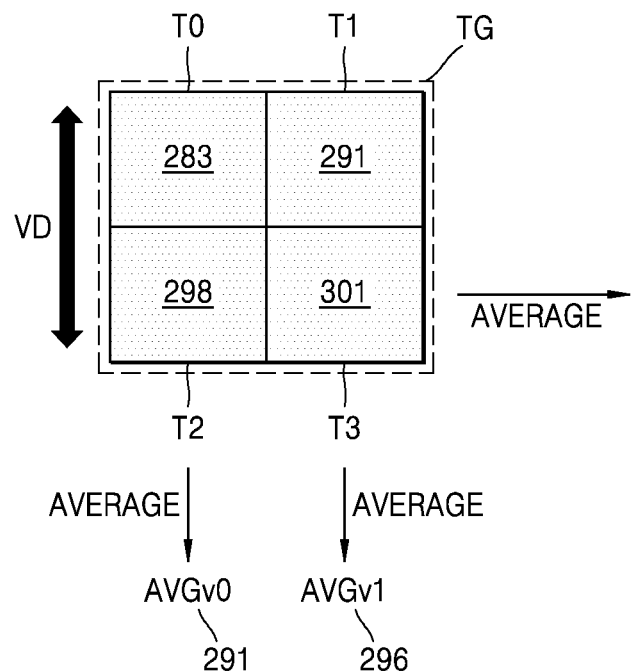
FIG. 6C is a conceptual diagram describing an operation of the compression method of FIG. 5.

As illustrated in FIG. 6C, when the vertical direction VD is determined as the averaging direction, the balance mode compressor BMC may average the pixel values of the target pixels T0 and T2, and average the pixel values of the target pixels T1 and T3. Accordingly, an average value AVGv0 of the target pixels T0 and T2, which is 291 (≈(283+298)/2), and an average value AVGv1 of the target pixels T1 and T3, which is 296 (=(291+301)/2), may be calculated.

The balance mode compressor BMC may generate the balance information based on the reference pixels (S140).

There may be a difference between the average value and the pixel value. The balance mode compressor BMC may generate the balance information for compensating for a difference between the average value and the pixel value. The balance information may include information for compensating a difference between the average value and the pixel value, and may include a select value indicating whether the pixel values are to be restored by applying a difference value between the reference values of the neighboring pixels to the average value (that is, an absolute value of the difference value) during the encoding operation, and a slope value indicating whether to add or deduct a difference value (or a preset default value) to or from the average value with respect to a certain pixel.

Figure 6D:
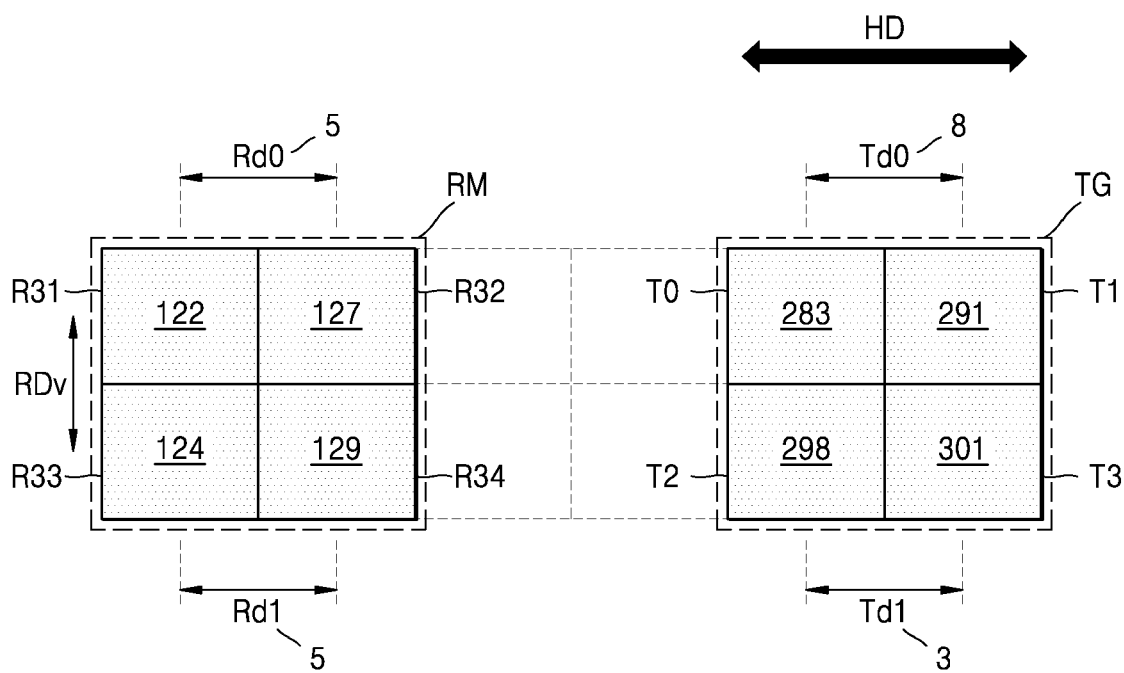
FIG. 6D is a conceptual diagram describing an operation of the compression method of FIG. 5.

Referring to FIG. 6D, when the averaging direction is determined as the horizontal direction HD, the balance mode compressor BMC may calculate a difference value Rd0 of the reference pixels R31 and R32 and a difference value Td0 of the target pixels, for example, T0 and T1, and may determine a first select value indicating whether to apply the different value as the compensation value when decoding the target pixels T0 and T1, by comparing the difference value Rd0 to the difference value Td0.

For example, when the difference value Rd0 of the reference pixels is not '0' and is equal to or less than the difference value Td0 of the target pixels, the balance mode compressor BMC may determine the first select value indicating that the difference value Rd0 of the reference pixels is applied as the compensation value, for example, a code value '1'.

When the difference value Rd0 of the reference pixels is equal to or greater than the difference value Td0 of the target pixels and is '0', the balance mode compressor BMC may determine the first select value indicating that the difference value Rd0 of the reference pixels is not applied as the compensation value, for example, a code value '0'. In this case, a preset default value may be applied as the compensation value. Depending on the degree of loss of the average value, the optimal compensation value may be set as the default value. For example, when four bits of the average value are lost in the bitstream, the default value may be set as 4.

When the difference value Rd0 of the reference pixels greater than the difference value Td0 of the target pixels is applied as the compensation value during the decoding, a difference between restored pixel values of the target pixels, that is, decoded pixel values and original pixel values, that is, pixel values before encoding may be rather greater than a difference between the average value and the original pixel values. In addition, when the difference value Rd0 of the reference pixels is '0', and the difference value Rd0 of the reference pixels is applied as the compensation value, the difference value between the average value and the original pixel values may not be compensated. Accordingly, when the difference value Rd0 of the reference pixels is greater than the difference value Td0 of the target pixels or is '0', the balance mode compressor BMC may determine the first select value as the code value '0', and may apply the default value instead of the difference value Rd0 of the reference pixels as the compensation value according to the code value '0' of the first select value when decoding.

The balance mode compressor BMC may determine a first slope value indicating which pixel has a greater value among the target pixels T0 and T1. In other words, the first slope value may indicate whether to add or subtract a difference value to or from the average value for a certain pixel among the target pixels T0 and T1. For example, when the first slope value is the code value '0', the pixel value of the target pixel T0 may be greater than the pixel value of the target pixel T1, and when the first slope value is the code value '1', the pixel value of the target pixel T1 may be greater than the pixel value of the target pixel T0. Accordingly, when the first slope value is '0', at the timing of decoding, a value in which the compensation value (the difference value Rd0 or the default value) is added to the average value (e.g., AVGh0 in FIG. 6B) may be restored as the pixel value of the target pixel T0, and a value in which the compensation value is subtracted from the average value AVGH0 may be restored as the pixel value of the target pixel T1.

Similar to that described above, the balance mode compressor BMC may calculate a difference value Rd1 of the reference pixels R33 and R34 and a difference value Td1 of the target pixels T2 and T3, and may determine a second select value indicating whether to apply the difference value Rd1, when decoding the target pixels T2 and T3 by comparing the difference value Rd1 to the difference value Td1. In addition, the balance mode compressor BMC may determine a second slope value indicating slopes of the target pixels T2 and T3.

When the averaging direction is determined as the vertical direction VD, the balance mode compressor BMC may generate the balance information in a similar method to those described above.

Referring to FIG. 5 again, the balance mode compressor BMC may generate a bitstream including the average value, the balance information, and the compression information (S150).

On the other hand, as described above with reference to FIG. 3A, a compression method may further include, after the bitstream is generated, generating the restored pixel values by de-compressing the bitstream, and generating a restored image data including the reference pixels to be used for compressing a next target pixel group to which the compression is to be performed after the target pixel group based on the restored pixel values.

Figure 7A:
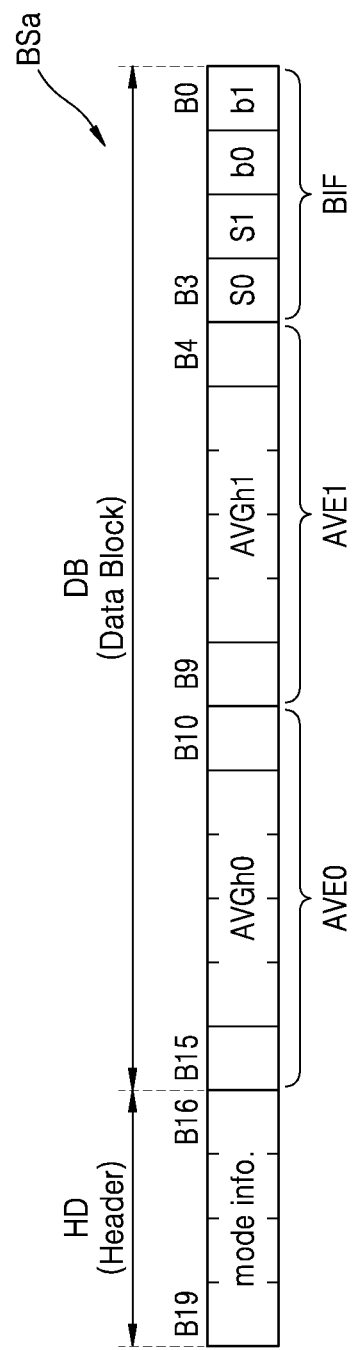
FIG. 7A is a conceptual diagram illustrating a bit stream according to an embodiment.
Figure 7B:
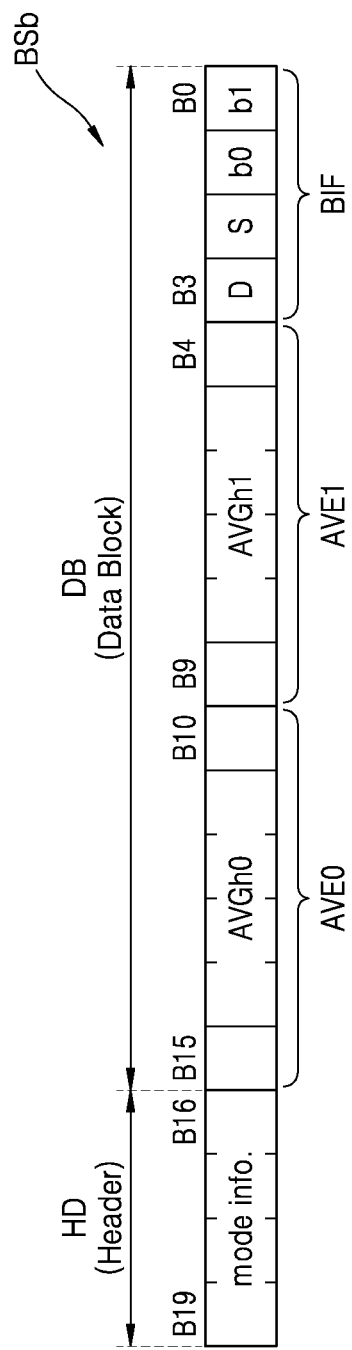
FIG. 7B is a conceptual diagram illustrating a bit stream according to an embodiment.

FIGS. 7A and 7B illustrate bit streams, according to embodiments.

It may be assumed that the pixel value of the target pixel before the compression (for example, T0, T1, T2, or T3 in FIG. 4) is represented by data including 10 bits, and as the target pixel group TG is compressed at a compression rate of about 50%, bitstreams BSa and BSb each comprise data including 20 bits.

Referring to FIGS. 7A and 7B, the bitstreams BSa and BSb may include a header HD and a data block DB. The header HD may include mode information including an encoding method used for the compression (for example, the DPCM method, the HV balance mode encoding method, or the like), the compression ratio, loss information, or the like, and the data block DB may include information according to the pixel values of the target pixels T0, T1, T2, and T3, for example, the plurality of average values, and the balance information related to the average values.

When a bitstream BSa or BSb is transmitted to the image processing device (e.g., 200 in FIG. 1) as the compressed data CDT, the decoder (e.g., 230 in FIG. 1) may determine the compression method (e.g., the encoding method) based on the mode information included in the header HD, and may de-compress the compressed data CDT by decoding the bitstreams BSa and BSb based on information included in a de-compression method corresponding to the compressing method (e.g., the decoding method) and the data block DB.

The header HD may be allocated to seventeenth through twentieth bits B16 through B19. As four bits are allocated to the header HD, the header HD may include one of 4×4 (=16) pieces of mode information.

The data block DB is allocated to first through sixteenth bits B0 through B15, and the data block DB may include first and second average regions AVE0 and AVE1, and a balance information region BIF. Each of the first and second average regions AVE0 and AVE1 may be allocated to six bits, the first average region AVE0 may be allocated to eleventh through sixteenth bits B10 through B15, and the second average region AVE1 may be allocated to fifth through tenth bits B4 through B9. The first average region AVE0 and the second average region AVE1 may include the average values of the target pixels AVGh0 and AVGh1 (or, AVGv0 and AVGv1).

The balance information region BIF may be allocated to four bits, that is, first through fourth bits B0 through B3.

Referring to FIG. 7A, the balance information region BIF may include a first slope value S0, a second slope value S1, a first select value b0, and a second select value b1. In this case, information about the averaging direction may be included in the header HD as the mode information.

Referring to FIG. 7B, the balance information region BIF may include information such as averaging direction. The balance information region BIF may include information D about the averaging direction, a slope value S, the first select value b0, and the second select value b1. The same slope value S may be applied to the target pixels T0 and T1 (or, T0 and T2) and the target pixels T2 and T3 (or, T1 and T3). For example, when the slope value S is the code value '1', during the encoding, for the target pixel T1 of the target pixels T0 and T1, the compensation value (for example, the difference value Rd0 in FIG. 6D or the default value) may be added to the average value (for example, AVGh0), and the compensation value may be subtracted from the average value for the target pixel T0. In addition, for the target pixel T3 of the target pixels T2 and T3, the compensation value (for example, the difference value Rd1 in FIG. 6D or the default value) may be added to the average value (for example, AVGh1), and the compensation value may be subtracted from the average value for the target pixel T2.

Figure 8:
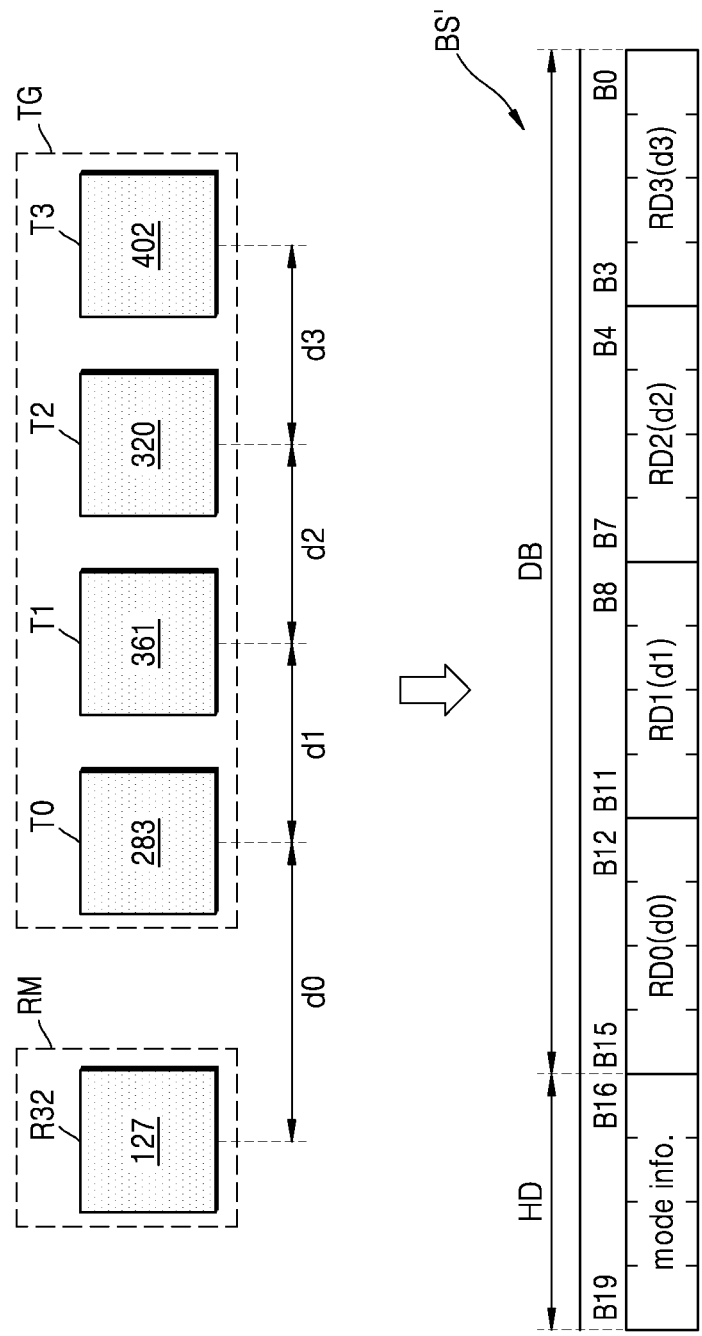
FIG. 8 is a conceptual diagram describing a compression method using a comparative example according to an embodiment.

FIG. 8 illustrates a compression method embodiment according to a comparative example of the compression method, where substantially duplicate description may be omitted. Comparatively, although FIGS. 6A-D and 7A-B may illustrate a compression method according to the HV method, embodiments are not limited thereto. For example, FIG. 8 illustrates a compression method according to the DPCM method using the reference map RM, and for example, the compression method may be performed by the normal mode compressor (e.g., NMC in FIGS. 3A and 3B).

Referring to FIG. 8, the normal mode compressor NMC may compress the target pixels T0, T1, T2, and T3, based on the reference value of at least one reference pixel included in the reference map RM. For example, a reference pixel R32 of the reference map RM may be used for compression of the target pixel group TG.

The normal mode compressor NMC may calculate a difference value d0 between the reference value of the reference pixel R32 and the pixel value of the target pixel T0. For example, the reference value of 127 may be subtracted from the pixel value of 283, and thus, the difference value d0 may be 156. In this case, when the pixel value is less than a compensation reference value, the difference value d0 may have a negative value. Alternatively, the difference value d0 may be generated by subtracting the pixel value from the compensation reference value.

The normal mode compressor NMC may calculate difference values d1, d2, and d3 among the target pixels T0, T1, T2, and T3. The difference values d1, d2, and d3 may be 78 (=361−283), −41 (=320−361), and 82 (=402−320), respectively.

The balance mode compressor BMC may generate a bitstream BS' for the target pixel group TG based on the difference value d0 between the reference value of the reference pixel R32 and the pixel value of the target pixel T0, and the difference values d1, d2, and d3 between the target pixels T0, T1, T2, and T3.

The bitstream BS' may include the header HD and the data block DB, and the data block DB may include a plurality of remaining regions, for example, first through fourth remaining regions RD0, RD1, RD2, and RD3. For example, the first through fourth remaining regions RD0, RD1, RD2, and RD3 may include the difference values d0, d1, d2, and d3 calculated with reference to FIG. 8. As a non-limiting example, values included in the bitstream BS' may be represented as negative values and positive values by using a most significant number bit representation method.

Each of the first through fourth remaining regions RD0, RD1, RD2, and RD3 may be allocated to the same number of bits. For example, the fourth remaining region RD3 may be allocated to the first through fourth bits B0 through B3, the third remaining region RD2 may be allocated to the fifth through eighth bits B4 through B7, the second remaining region RD1 may be allocated to the ninth through twelfth bits B8 through B11, and the first remaining region RD0 may be allocated to the thirteenth through sixteenth bits B12 through B15.

On the other hand, the difference value d0 may be 156, and the difference values d1, d2, and d3 may be 78, −41, and 82, respectively. The difference values d1, d2, and d3 may be represented by similar or identical number of bits (for example, eight bits including seven bits representing an absolute value and one bit representing a sign). However, the difference value d0 may be largely different from the difference values d1, d2, and d3, and eight bits may be required for representing the absolute value of the difference value d0. However, because the first through fourth remaining regions RD0, RD1, RD2, and RD3 are allocated to the identical number of bits, when the normal mode compressor NMC performs the compression on the pixel group PG of the isolated region based on the compression method according to the present comparison example, a large amount of data loss may occur.

Accordingly, the image sensor module (e.g., 100 in FIG. 1) according to an embodiment may, when the target pixel group TG corresponds to the isolated region, perform the compression on the target pixel group TG by using the HV balance encoding method, reduce the compression loss, and improve the compression efficiency.

Figure 9:
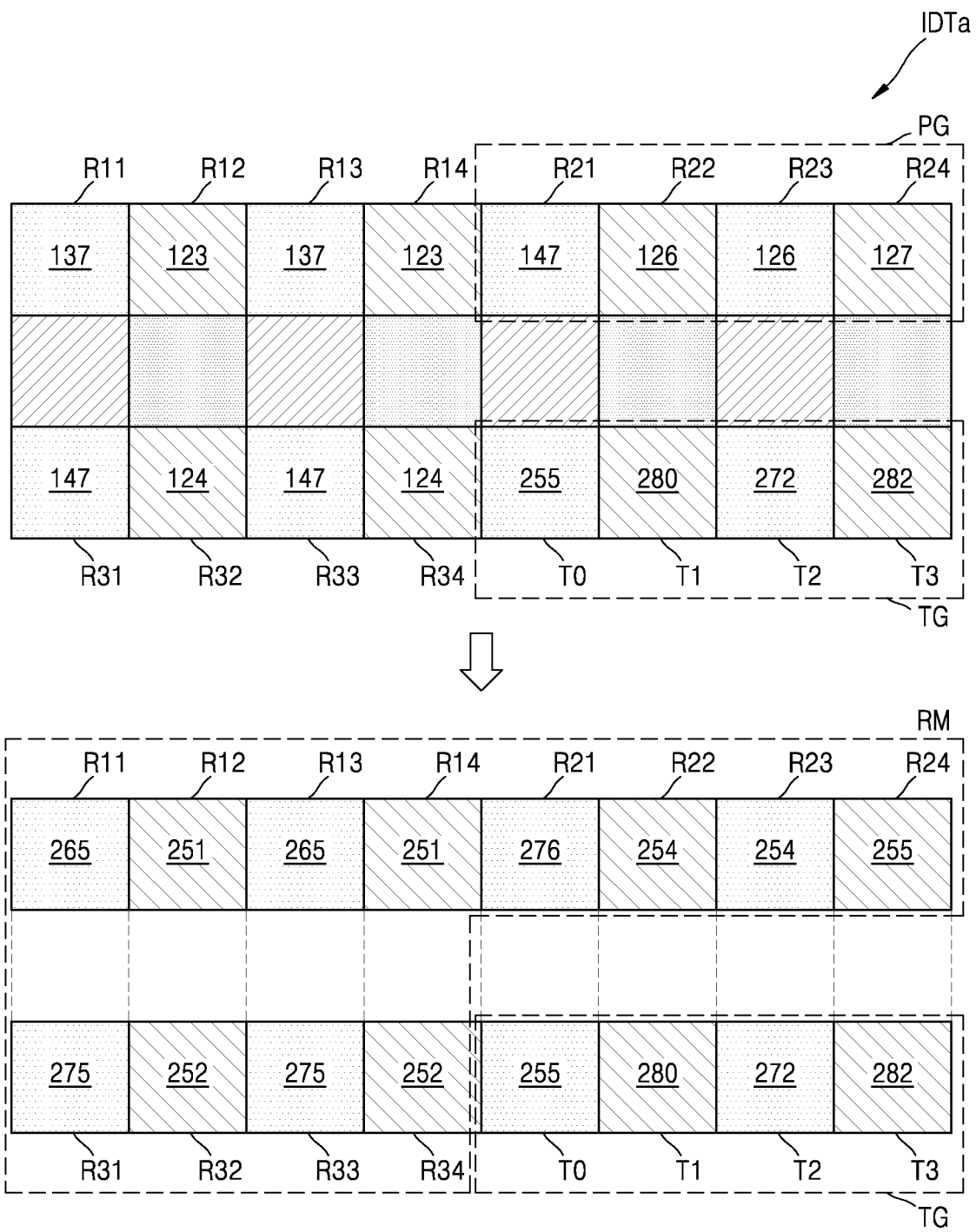
FIG. 9 is a conceptual diagram illustrating image data and a reference map according to an embodiment.

FIG. 9 illustrates image data and a reference map, according to an embodiment.

In FIG. 9, image data IDTa may include a Bayer pattern. In an embodiment, the pixel group PG may be set by using continuously arranged four pixel units. In an embodiment, the pixel group PG may include two red pixels and two green pixels, or two blue pixels and two green pixels.

The compression may be performed in units of pixel groups PG, and the reference values of the reference pixels (for example, R11, R12, R13, R14, R21, R22, R23, R24, R31, R32, R33, and R34) of the pixel group PG corresponding to the same color of the pixel groups PG which are compressed ahead of the target pixel group TG and adjacent to the target pixel group TG may be generated as the reference map RM to be used for compressing the target pixel group TG.

There may be a significant difference (e.g., 125 or more without limitation thereto) between pixel values of the target pixel group TG and the reference pixels R11, R12, R13, R14, R21, R22, R23, R24, R31, R32, R33, and R34, and the target pixel group TG may be determined to correspond to the isolated region. Accordingly, the target pixel group TG may be compressed based on the HV balance encoding method.

Figure 10:
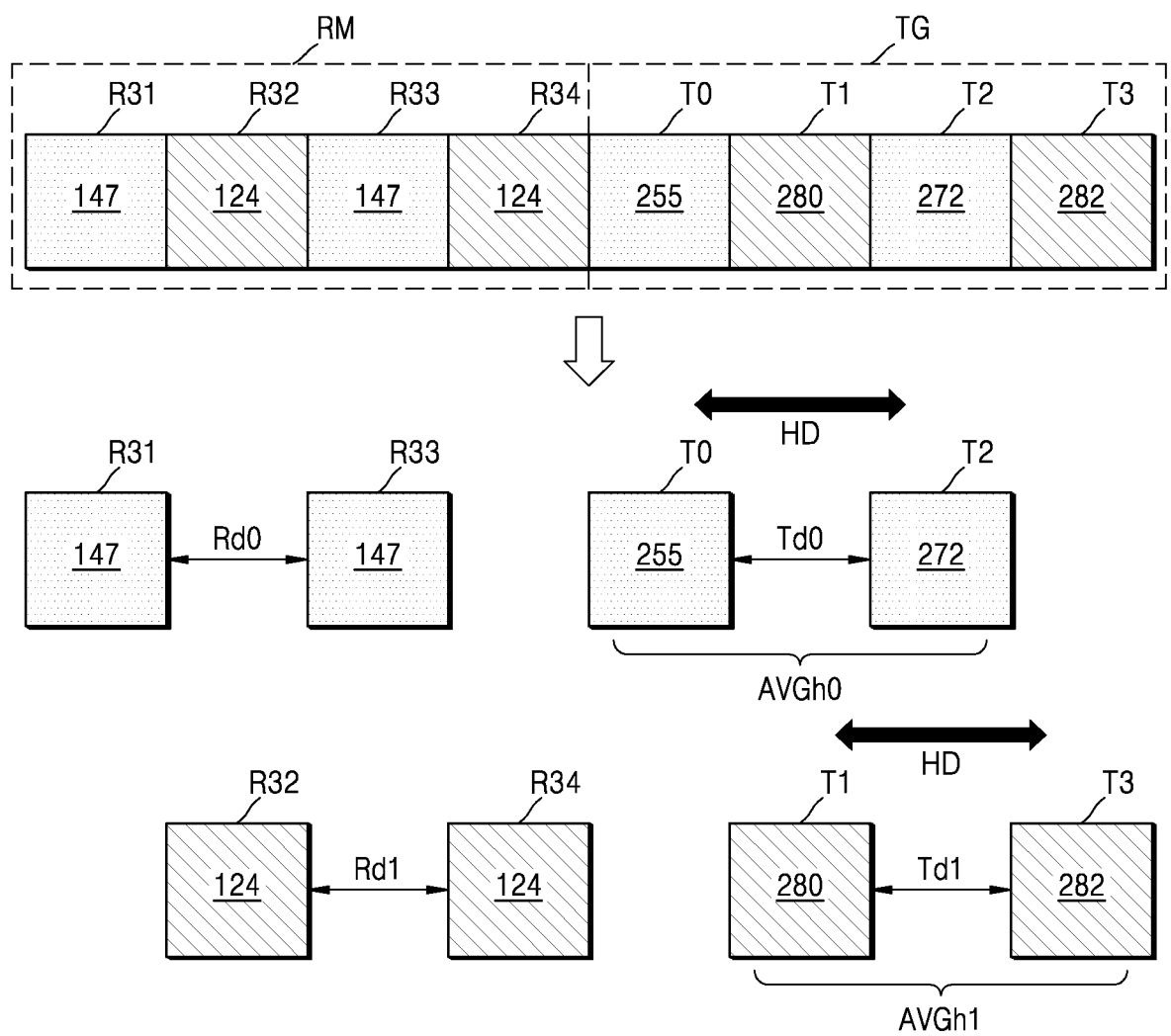
FIG. 10 is a conceptual diagram describing a compression method according to an embodiment.

FIG. 10 illustrates a compression method, according to an embodiment. The compression method of FIG. 10 may be performed by using the reference map RM on the image data IDTa in FIG. 9.

Referring to FIG. 10, the balance mode compressor (e.g., BMC in FIG. 3A) may compress the target pixels T0, T1, T2, and T3, based on the reference values of at least one pixel group included in the reference map RM. For example, the reference pixels R31, R32, R33, and R34 may be used for compressing the target pixel group TG. During the compression, a reference pixel having the same color as the target pixel may be used.

The pixel group PG includes four pixels continuously arranged in the horizontal direction HD, and the balance mode compressor BMC may determine the horizontal direction HD as the averaging direction. The balance mode compressor BMC may calculate a first average value AVGh0 by averaging the pixel values of the target pixels T0 and T2 corresponding to the same color, and calculate a second average value AVGh1 by averaging the pixel values of the target pixels T1 and T3 corresponding to the same color.

The balance mode compressor BMC may generate the balance information about the target pixels T0 and T2, for example, the first select value and the first slope value based on the difference value Rd0 of the reference values of the reference pixels R31 and R33 and the difference value Td0 of the pixel values of the target pixels T0 and T2. The balance mode compressor BMC may generate the balance information about the target pixels T1 and T3, for example, the second select value and the second slope value based on the difference value Rd1 of the reference values of the reference pixels R32 and R34 and the difference value Td1 of the pixel values of the target pixels T1 and T3.

The balance mode compressor BMC may calculate a difference value d0 between the compensation reference value of the reference pixel R33 and the pixel value of the target pixel T0, and in addition, calculate the difference value d1 between the pixel values of the target pixels T0 and T2. In addition, the balance mode compressor BMC may calculate a difference value d2 between the compensation reference value of the reference pixel R34 and the pixel value of the target pixel T1, and may calculate the difference value d3 between the pixel values of the target pixels T1 and T3. The balance mode compressor BMC may generate a bitstream BS (see, e.g., BSa of FIG. 7A, BSb of FIG. 7B, and/or BS' of FIG. 8, without limitation thereto) based on the difference values d0, d1, d2, and d3. The difference values d0, d1, d2, and d3 may be included in the data block DB of the bitstream BS.

The balance mode compressor BMC may generate the bitstream BS (for example, BSa in FIG. 7A or BSb in FIG. 7B) based on the first and second average values AVGh0 and AVGh1 and the balance information.

Figure 11A:
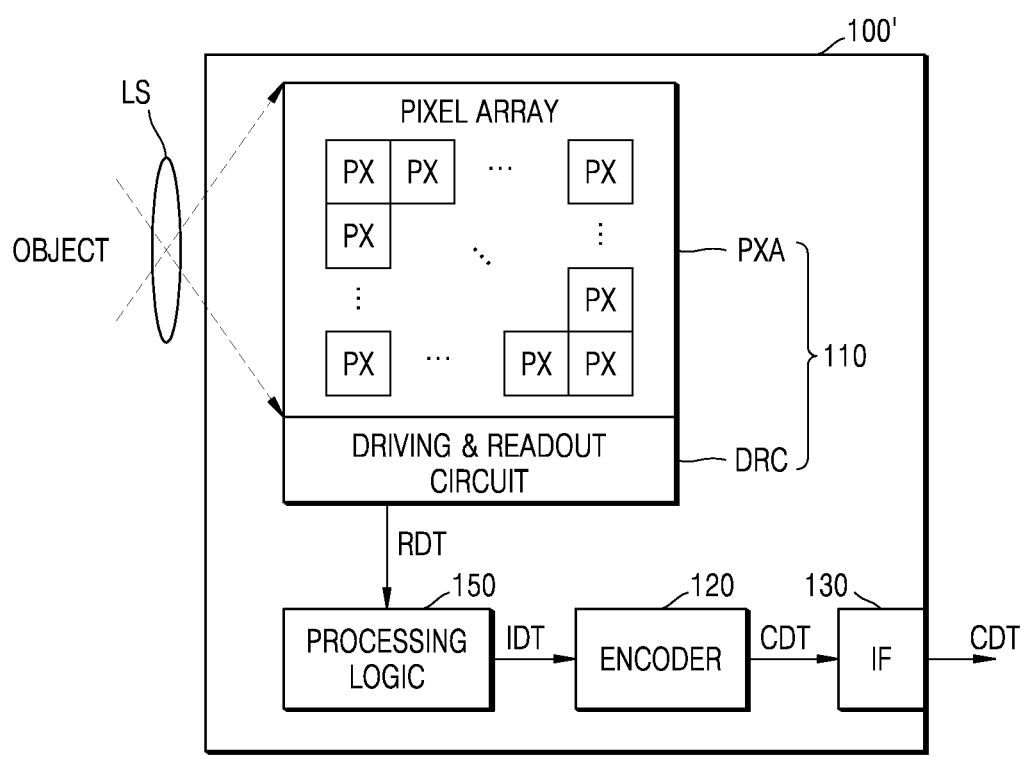
FIG. 11A is a block diagram illustrating image sensor modules according to an embodiment.
Figure 11B:
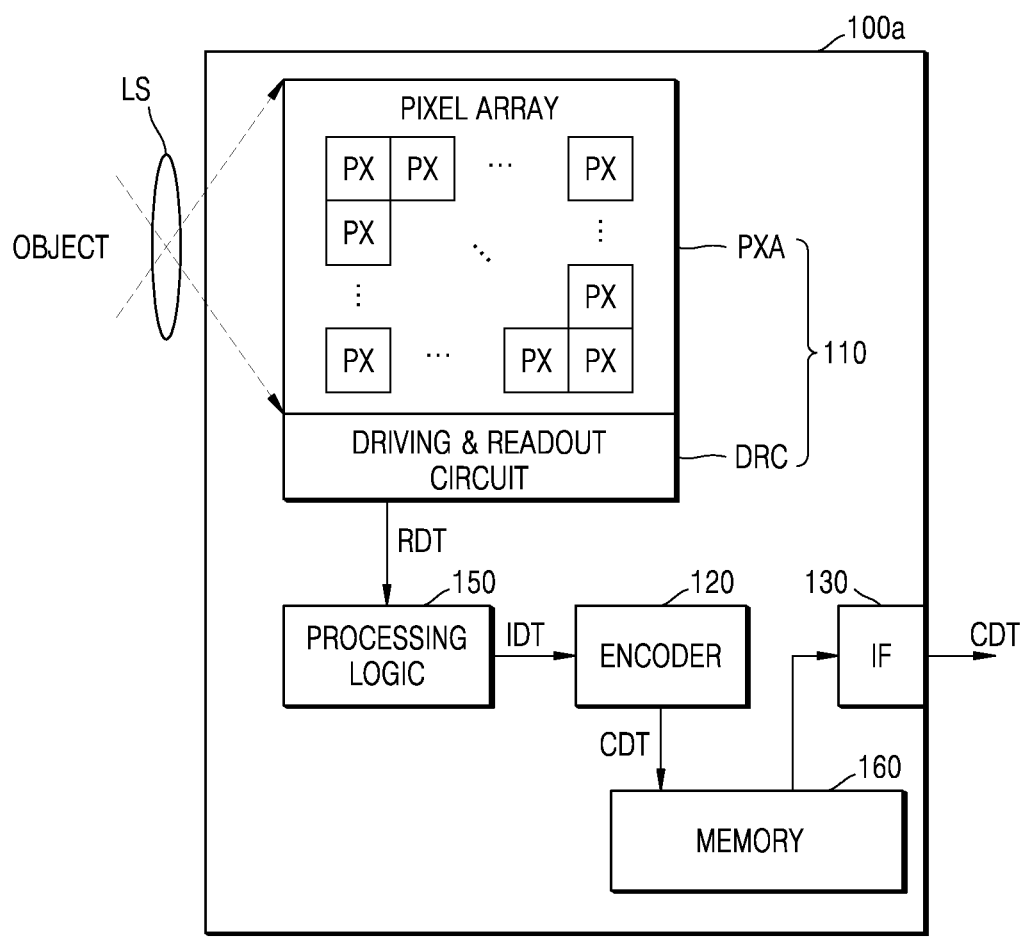
FIG. 11B is a block diagram illustrating image sensor modules according to an embodiment.

FIGS. 11A and 11B illustrate image sensor modules, according to embodiments.

Referring to FIG. 11A, an image sensor module 100' may include the image sensor 110, the encoder 120, and the I/F 130 substantially as in the image sensor 100 of FIG. 1, as well as processing logic 150. Duplicate description may be omitted.

The image sensor 110 may include the pixel array PXA and a driving & readout circuit DRC. As described above, the pixel array PXA may include the plurality of pixels PX arranged in rows and columns. The driving & readout circuit DRC may control the pixel array PXA, and covert the pixel signals received from the pixel array PXA to the pixel values. The driving & readout circuit DRC may generate an original image data RDT including the pixel values respectively corresponding to the received pixel signals.

The processing logic 150 may perform a pre-processing on the original image data RDT. For example, the pre-processing may include an image processing, such as bad pixel correction, crosstalk compensation, noise reduction, binning, size change, and color space conversion.

The encoder 120 may generate the compressed data CDT by compressing the image data IDT (or the original image data RDT) received from the processing logic 150. The encoder 120 may compress the image data IDT in units of pixel groups, and compress the target pixel group to which the compression is to be performed by using the neighboring pixel group to which the compression has been performed. As described above, when the target pixel group corresponds to an isolated region, the encoder 120 may compress the target pixel group by using the HV balance encoding method.

The compressed data CDT may be provided to the I/F 130, and the I/F 130 may transmit the compressed data CDT to the image processing device (e.g., 200 in FIG. 1).

Referring to FIG. 11B, an image sensor module 100a may further include a memory 160. The memory 160 may include a volatile memory, such as DRAM and SRAM, or a non-volatile memory, such as PRAM, ReRAM, MRAM, and a flash memory. The compressed data CDT generated by the encoder 120 may be stored in the memory 160. The compressed data CDT may be read from the memory 160, and output via the I/F 130.

Figure 12:
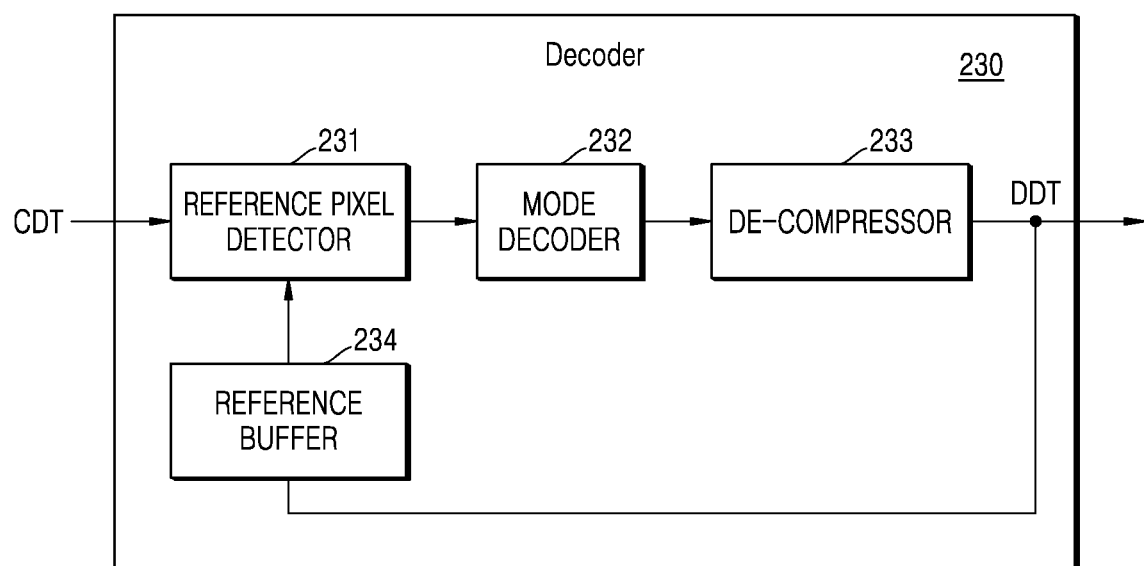
FIG. 12 is a schematic block diagram of a decoder according to an embodiment.

FIG. 12 illustrates a decoder 220, according to an embodiment.

The decoder 220 may generate the de-compressed data DDT, for example, the restored image data by de-compressing the compressed data CDT, by performing in a reverse order a series of operations performed for encoding the image data IDT by the encoder (e.g., 120 in FIG. 1).

The decoder 220 may de-compress the compressed data CDT by using a decoding method corresponding to the encoding method used by the encoder 120. The decoder 220 may decode the compressed data CDT in units of bitstreams.

The decoder 220 may include a reference pixel detector 221, a mode decoder 222, a de-compressor 223, and a reference buffer 224.

The reference pixel detector 221 may receive the compressed data CDT, and receive the reference map RM to be used for de-compressing a target bitstream, that is to be de-compressed, of the bitstreams included in the compressed data CDT from the reference buffer 224. The reference map RM may include the reference values of the neighboring pixels of the pixel group related to the bitstream to be referenced, that is, the reference values of the reference pixels.

The reference pixel detector 221 may detect the reference value of the reference pixels location-wise adjacent to the target pixel group in the restored image data stored in the reference buffer, that is, the restored pixel values of the reference pixels, and may receive the reference values from the reference buffer 224 as the reference map RM. The reference pixel detector 221 may provide the target bitstream of the compressed data CDT and the reference map RM to the mode decoder 222 or the de-compressor 223.

The mode decoder 222 may decode the header HD of the bitstream, and determine the mode information, the compression ratio, the loss information, or the like by using a result of the decoding. According to an embodiment, the mode decoder 222 may verify that the compression has been performed in the HV balance encoding method or another encoding method (for example, the DPCM method) by using the result of decoding the header HD.

The de-compressor 223 may restore the target pixels from the bitstream based on the determined compression mode, compression ratio, loss information, or the like. According to an embodiment, when determining that the bitstream has been generated in the HV balance encoding method by using the result of decoding the header HD, the de-compressor 223 may verify the average values and the balance information from data blocks of the bitstream, and may restore the pixel values of the compressed pixels by applying the compensation value to the average values based on the balance information. The pixel groups generated by decoding the bitstream may be output as the de-compressed data DDT.

The reference buffer 224 may store the de-compressed data DDT, that is, restored image data. In an embodiment, the reference buffer 224 may store pixel groups corresponding to the bitstream to be de-compressed next of the restored image data. In an embodiment, a memory or a buffer (for example, the memory 220) equipped in the image processing device (e.g., 200 in FIG. 1) may be used as the reference buffer 224.

Figure 13:
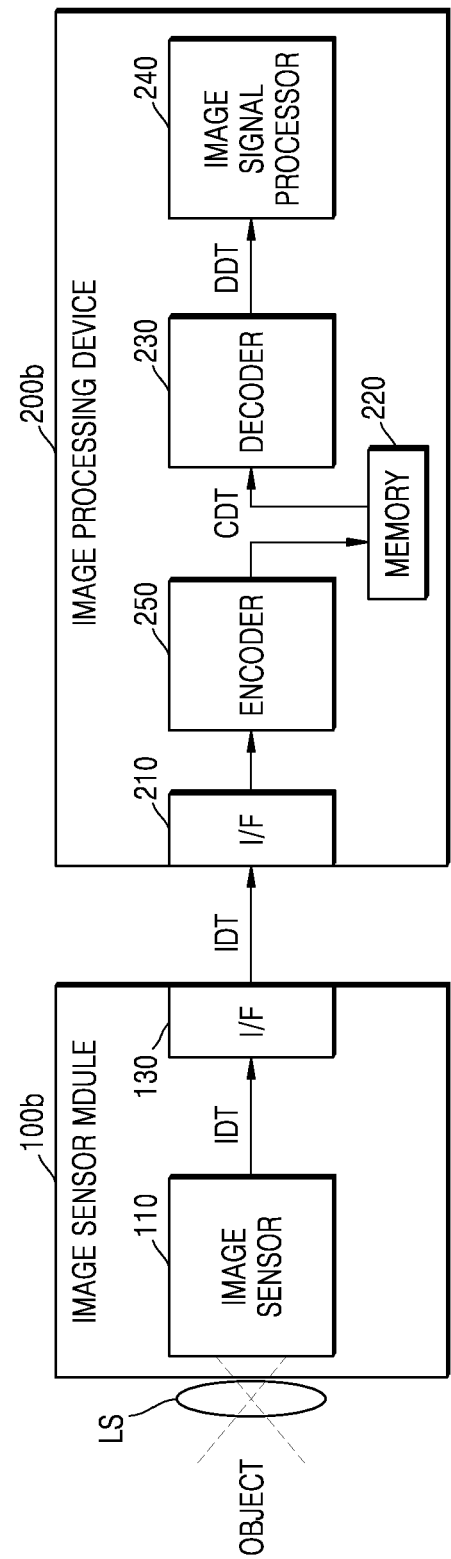
FIG. 13 is a block diagram of an image processing system according to an embodiment.

FIG. 13 illustrates an image processing system 10b, according to an embodiment. The image processing system 10b is a modifiable embodiment of the image processing system 10 of FIG. 1.

Referring to FIG. 13, the image processing system 10b may include an image sensor module 100b and an image processing device 200b. The image sensor module 100b may include the image sensor 110 and the I/F 130. The image sensor module 100b may further include a memory. The image processing device 200b may include the I/F 210, an encoder 250, the decoder 230, an image signal processor 240, and the memory 220. The encoder 250 in FIG. 13 may correspond to the encoder 120 in FIG. 1.

Comparing the image processing system 10b of FIG. 13 to the image processing system 10 of FIG. 1, the image processing device 200b, which is different from the image sensor module 100b, may include the encoder 250, and the image processing device 200b may compress the image data IDT. Other components may be substantially the same as each other. Duplicate descriptions of components of the image processing system 10b, which are substantially similar to components of the image processing system 10 of FIG. 1, may be omitted.

Referring to FIG. 13, the image sensor module 100b may generate the image data IDT (the original image data or pre-processed image data). The image data IDT may be transmitted to the image processing device 200b via the I/F 130. The image processing device 200b may receive the image data IDT from the image sensor module 100b, encode the image data IDT to form compressed data CDT, and store the compressed data CDT to the memory 220. Thereafter, the decoder 230 may read the compressed data CDT stored in the memory 220, and de-compress the compressed data CDT. The decoder 230 may provide the compressed data CDT, for example, the restored image data to the image signal processor 240.

As described above, compression and de-compression may be performed in units of pixel groups, a pixel group corresponding to an isolated region of the compressed data CDT may be compressed or de-compressed based on the HV balance encoding method.

FIG. 14 illustrates compression information, according to an embodiment. FIG. 14 illustrates an example of a compression mode (or compression method) according to a standard proposed by the mobile industry processor interface (MIPI) Alliance.

Referring to FIG. 14, the image data (e.g., IDT in FIG. 2) of the tetra pattern may be compressed according to various compression modes. However, embodiments are not limited thereto, and image data, in which a red pixel group, a blue pixel group, a first green pixel group, and a second green pixel group including pixels arranged in an n×n matrix are alternately arranged, may be compressed according to various compression modes.

As the compression mode, an average-based directional differential (AD) mode, an extended multi-pixel-based differential (eMPD) mode, an extended horizontal or vertical direction-based differential (eHVD) mode, an extended horizontal or vertical average-based differential (eHVA) mode, an oblique direction-based differential (OD) mode, an extended outlier compensation (eOUT) mode, an outlier compensation (OUT) mode, and a fixed quantization and no-reference (FNR) mode may be used. However, names of the above-described compression modes may be only examples, and embodiments are not limited thereto.

In the AD mode, the encoding may be performed on the target pixel group by using the DPCM method. For example, the bitstream (for example, BSa in FIG. 7A) may be generated based on a difference value between an average value of pixel values of a target pixel group, and a difference value between each pixel value and the average value.

The AD mode may be divided into MODE0, MODE1, MODE2, and MODE3 according to detailed implementation algorithm. Because four bits may be allocated to the header HD representing a compression method, sixteen compression modes may represent header information by using different bits from each other. For example, MODE0 may be represented by bits 0000, MODE1 may be represented by bits 0001, MODE2 may be represented by bits 0010, and MODE3 may be represented by bits 0011.

In the OD mode, image data IDT of a diagonal structure may be compressed. The OD mode may be divided into MODE4 (e.g., bits 0100) and MODE5 (e.g., bits 0101) according to a detailed implementation algorithm. Similarly, the eMPD mode may include MODE8 (e.g., bits 1000), MODE9 (e.g., bits 1001), MODE10 (e.g., bits 1010), and MODE11 (e.g., bits 1011), and eHVD mode may include MODE12 (e.g., bits 1100) and MODE13 (e.g., bits 1101).

The eHVA mode may include MODE14 (e.g., bits 1110). The HV balance mode according to an embodiment may correspond to the eHVA mode, and the balance mode compressor (e.g., BMC in FIG. 3A) may generate the bitstream including a header HD indicating the eHVA mode.

The eOUT mode may include MODE15 (e.g., bits 1111), and the OUT mode may include MODE7 (e.g., bits 0111). The FNR mode may include MODE6 (e.g., bits 0110). In an embodiment, the MODE7 (e.g., 0111) may be included in the eOUT mode according to a value stored in a register.

In an embodiment, the mode selector (e.g., 123 in FIGS. 3A and 3B) may sequentially evaluate the AD mode, the eMPD mode, the eHVD mode, the eHVA mode, the OD mode, the eOUT mode, the OUT mode, and the FNR mode, and may select an optimum mode according to a compression evaluation index, such as the compression ratio and loss information. However, the present disclosure is not limited to the described mode evaluation sequence.

Figure 15A:
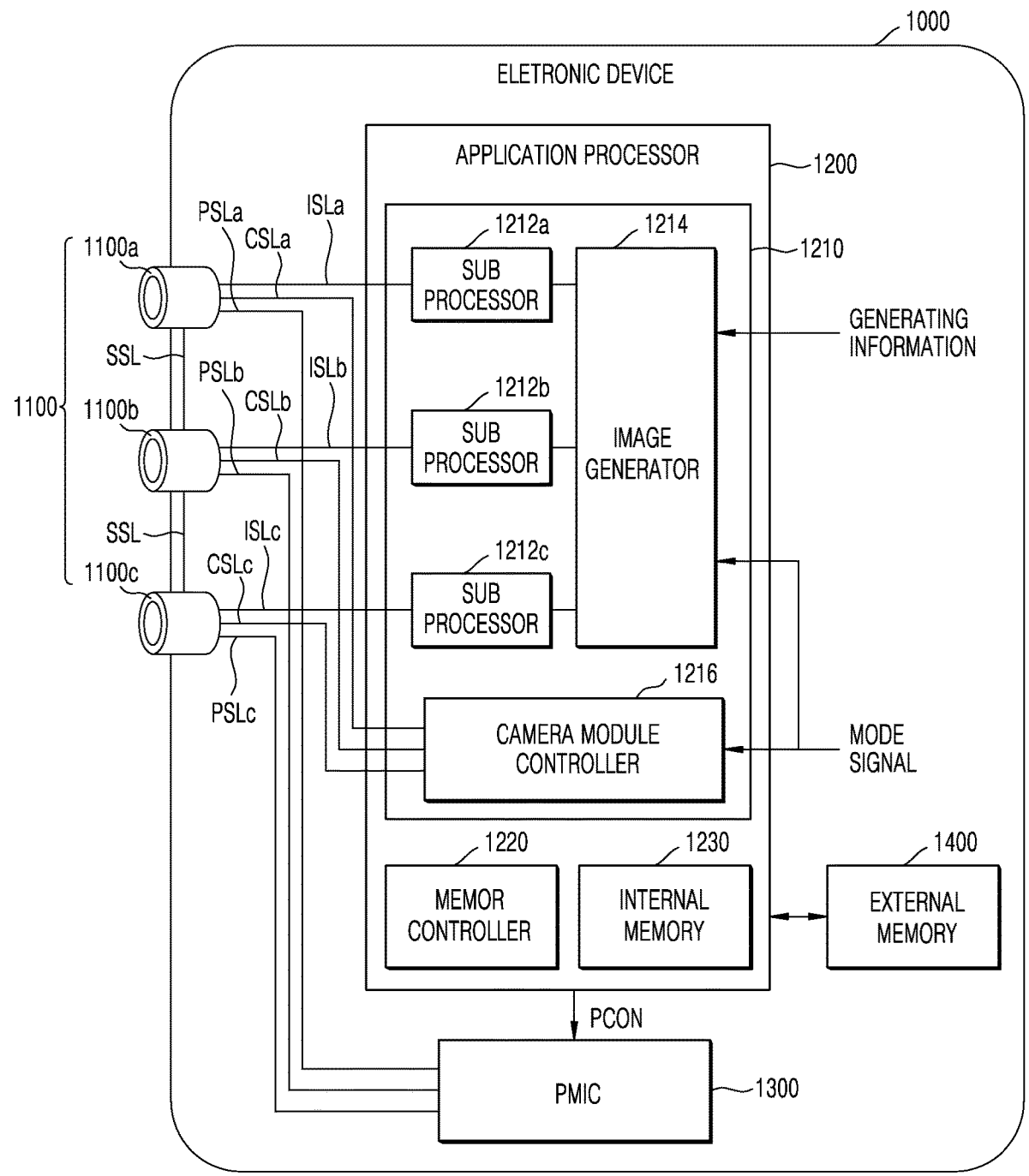
FIG. 15A is a block diagram of an electronic device including a multi-camera module.
Figure 15B:
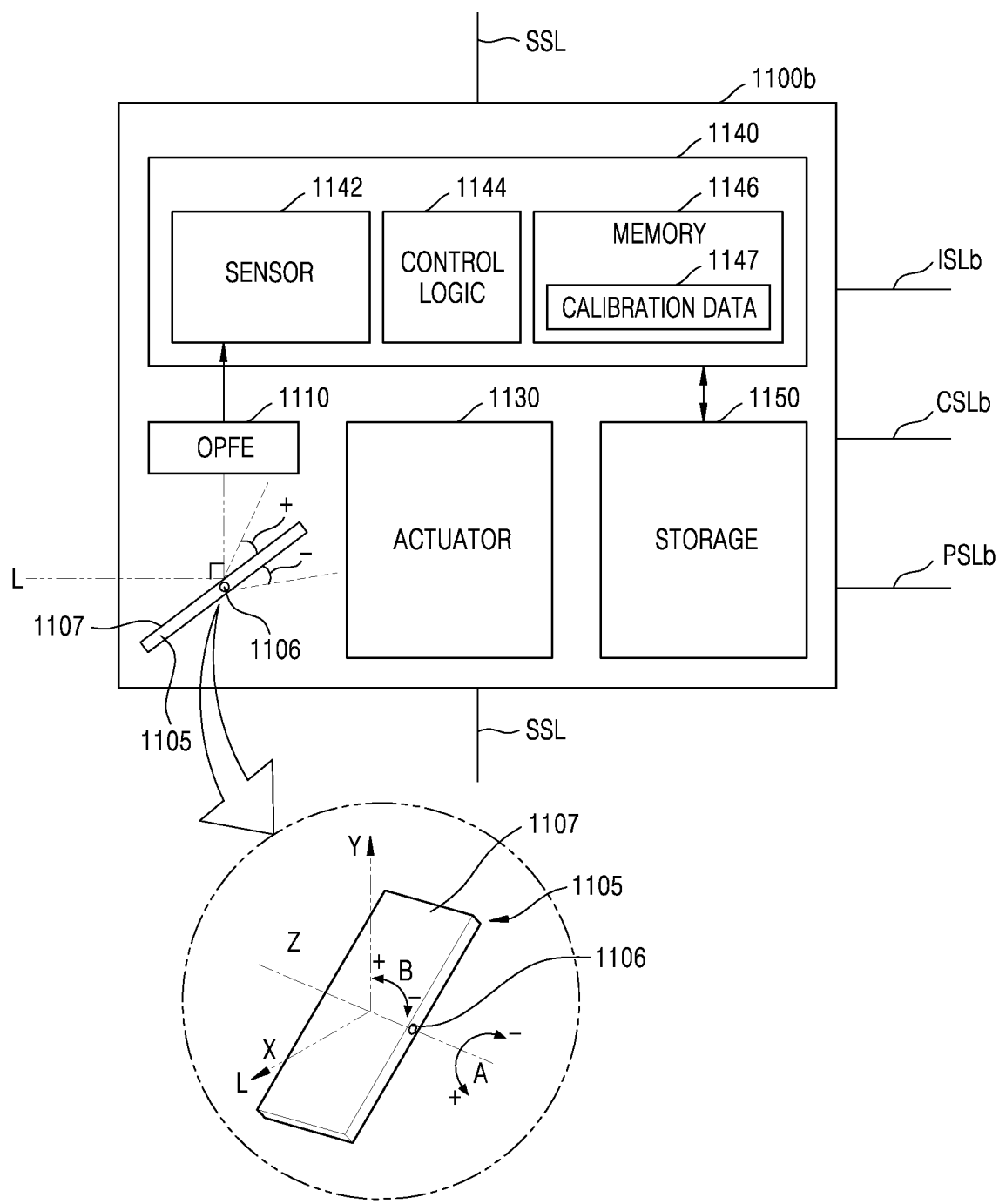
FIG. 15B is a block diagram of a camera module in FIG. 15A.

FIG. 15A illustrates an electronic device 1000 including a multi-camera module having multiple camera modules, and FIG. 15B illustrates a camera module in FIG. 15A.

Referring to FIG. 15A, the electronic device 1000 may include a multi-camera module 1100, an application processor 1200, a PMIC 1300, and an external memory 1400.

The multi-camera module 1100 may include a plurality of camera modules 1100a, 1100b, and 1100c. Although the drawing illustrates an embodiment in which three camera modules 1100a, 1100b, and 1100c are arranged, embodiments are not limited thereto. In an embodiment, the multi-camera module 1100 may include only two camera modules, or may be modified and embodied to include k (where k is a natural number equal to or greater than 4) camera modules.

Hereinafter, referring to FIG. 15B, detailed configurations of the camera module 1100b will be described, but the descriptions below may be identically applied to other camera modules 1100a and 1100c according to embodiments.

Referring to FIG. 15B, the camera module 1100b may include a prism 1105, an optical path folding element (hereinafter referred to as OPFE) 1110, an actuator 1130, and an image sensing device 1140, and a storage 1150.

The prism 1105 may change a path of light L incident from the outside including a reflective surface 1107 of a light reflecting material.

In several embodiments, the prism 1105 may change a path of light L incident in a first direction X to a second direction Y perpendicular to the first direction X. In addition, the prism 1105 may rotate the reflective surface 1107 of the light reflecting material to a direction A with a center axis 1106 as a center, or change the path of the light L incident in the first direction X to the second direction Y by rotating the center axis 1106 to a direction B. In this case, the OPFE 1110 may be moved to a third direction Z perpendicular to the first direction X and the second direction Y.

In several embodiments, as illustrated, the maximum rotation angle in the direction A of the prism 1105 may be equal to or less than about 15 degrees in a plus (+) direction A, and greater than about 15 degrees in a minus (−) direction A, but the embodiments are not limited thereto.

In several embodiments, the prism 1105 may be moved about 20 degrees, or between about 10 degrees and about 20 degrees, or between about 15 degrees and 20 degrees in the plus (+) or minus (−) directions B, and in this case, the moving degrees may be the same degrees in the plus (+) or the minus (−) directions B, or almost similar degrees thereto within a range of about 1 degree.

In several embodiments, the prism 1105 may move the reflecting surface 1107 to a third direction (for example, Z direction) in parallel with an extended direction of the center axis 1106.

In several embodiments, the camera module 1100b may include two or more prisms, and the path of the light L incident in the first direction X through these prisms may be variously changed, such as to the second direction Y perpendicular to the first direction X, again to the first direction X or to the third direction Z, and back to the second direction Y.

The OPFE 1110 may include, for example, an optical lens including m (where m is a natural number) groups. The m lenses may move in the second direction Y and change an optical zoom ratio of the camera module 1100b. For example, when a basic optical zoom ratio of the camera module 1100b is Z, and m optical lenses included in the OPFE 1110 are moved, the optical zoom ratio of the camera module 1100b may be changed to an optical zoom ratio of 3Z or 5Z or more.

An actuator 1130 may move the OPFE 1110 or the optical lens (hereinafter referred to as an optical lens) to a certain position. For example, the actuator 1130 may adjust a location of the optical lens so that the image sensor 1142 is positioned at a focal length of the optical lens for an accurate sensing.

The image sensing device 1140 may include an image sensor 1142, a control logic 1144, and a memory 1146. The image sensor module 100 in FIG. 1 or the image sensor module 100b in FIG. 13 may be applied as the image sensing device 1140.

The image sensor 1142 may sense an image of a sensing target by using the light L provided through the optical lens. The control logic 1144 may control all operations of the camera module 1100b and process sensed image. For example, the control logic 1144 may control an operation of the camera module 1100b according to a control signal provided via a control signal line CSLb, and may perform an image processing, such as extracting image data corresponding to a particular image from the sensed image (for example, a face, an arm, a leg, or the like of a man in the image), and noise reduction.

In an embodiment, the control logic 1144 may include the encoder (e.g., 120 in FIG. 1), and compress (or encode) the sensed image or image-processed image. as described above, the encoder 120 may compress the image in units of pixel groups, and compress the pixel group of an isolated region according to the HV balance encoding method.

The memory 1146 may store information required for operations of the camera module 1100b like a calibration data 1147. The calibration data 1147 may be information required for generating the image data by using the light L provided from the outside of the camera module 1100b, and may include information, for example, information about a degree of rotation, information about the focal length, information about the optical axis, or the like. When the camera module 1100b is implemented in a multi-state camera form in which the focal length varies according to the position of the optical lens, the calibration data 1147 may include the focal length value per position (or per state) of the optical lens and information about auto-focusing.

In several embodiments, compressed data may be stored in the memory 1146. In addition, the memory 1146 may be used as the reference buffer 125 of the encoder 120.

The storage 1150 may store the image data sensed by the image sensor 1142. The storage 1150 may be arranged outside the image sensing device 1140, and may be implemented as a sensor chip constituting the image sensing device 1140 and in a stacked form. In several embodiments, the image sensor 1142 may include a first chip, and the control logic 1144, the storage 1150, and the memory 1146 may include a second chip, and accordingly, all of them may be implemented in a two chip-stacked form.

In several embodiments, the storage 1150 may be implemented as an electrically erasable programmable read-only memory (EEPROM), but the embodiments are not limited thereto. In several embodiments, the image sensor 1142 may include a pixel array, and the control logic 1144 may include an analog to digital converter and an image signal processor for processing sensed image.

Referring to FIGS. 15A and 15B together, in several embodiments, each of the plurality of camera modules 1100a, 1100b, and 1100c may include the actuator 1130. Accordingly, each of the plurality of camera modules 1100a, 1100b, and 1100c may include an identical or different calibration data 1147 to or from each other according to an operation of the actuator 1130 included therein.

In several embodiments, one camera module (for example, 1100b) of the plurality of camera modules 1100a, 1100b, and 1100c may include a camera module of a folded lens type including the above-described prism 1105 and OPFE 1110, and the other camera modules (for example, 1100a and 1100c) may include a camera module of a vertical type not including the prism 1105 and the OPFE 1110, but the embodiments are not limited thereto.

In several embodiments, one camera module (for example, 1100c) of the plurality of camera modules 1100a, 1100b, and 1100c may include a vertical-type depth camera which extracts depth information by using, for example, an infrared ray (IR). In this case, the application processor 1200 may generate a three-dimensional (3D) depth image by merging image data provided by the vertical depth camera with image data provided by other camera modules (for example, 1100a or 1100b).

In several embodiments, at least two camera modules (for example, 1100a and 1100b) of the plurality of camera modules 1100a, 1100b, and 1100c may have different field of view from each other. In this case, for example, the optical lenses of at least two camera modules (for example, 1100a and 1100*b*) of the plurality of camera modules 1100*a*, 1100*b*, and 1100*c* may be different from each other, but embodiments are not limited thereto.

In addition, in several embodiments, the field of view of each of the plurality of camera modules 1100*a*, 1100*b*, and 1100*c* may be different from each other. For example, the camera module 1100*a* may include an ultrawide camera, the camera module 1100*b* may include a wide camera, and the camera module 1100*c* may include a tele camera, but embodiments are not limited thereto. In this case, optical lenses included in each of the plurality of camera modules 1100*a*, 1100*b*, and 1100*c* may also be different from each other, but embodiments are not limited thereto.

In several embodiments, each of the plurality of camera modules 1100*a*, 1100*b*, and 1100*c* may be arranged physically apart from each other. In other words, a sensing area of one image sensor 1142 may not be divided and used by the plurality of camera modules 1100*a*, 1100*b*, and 1100*c*, but the independent image sensor 1142 may be arranged inside each of the plurality of camera modules 1100*a*, 1100*b*, and 1100*c*.

Referring again to FIG. 15A, the application processor 1200 may include an image processing device 1210, a memory controller 1220, and an internal memory 1230. The application processor 1200 and the plurality of camera modules 1100*a*, 1100*b*, and 1100*c* may be implemented as being separated from each other as, for example, separate semiconductor chips.

The image processing device 1210 may include a plurality of sub-image processors 1212*a*, 1212*b*, and 1212*c*, an image generator 1214, and a camera module controller 1216.

The image processing device 1210 may include the plurality of sub-image processors 1212*a*, 1212*b*, and 1212*c* corresponding to the number of the plurality of camera modules 1100*a*, 1100*b*, and 1100*c*.

Image data generated by the camera module 1100*a* may be provided to the sub-image processor 1212*a* via an image signal line ISLa, image data generated by the camera module 1100*b* may be provided to the sub-image processor 1212*b* via an image signal line ISLb, and image data generated by the camera module 1100*c* may be provided to the sub-image processor 1212*c* via the image signal line ISLc. The transmission of the image data may be performed by using, for example, a CSI based on the MIPI, but embodiments are not limited thereto.

In an embodiment, at least one of the plurality of sub-image processors 1212*a*, 1212*b*, and 1212*c* may include the decoder (e.g., 230 in FIG. 1). When corresponding camera modules 1100*a*, 1100*b*, and 1100*c* include the encoder (e.g., 120 in FIG. 1), the plurality of sub-image processors 1212*a*, 1212*b*, and 1212*c* may include the decoder 230 for decompressing the compressed image data.

In several embodiments, the image processing device 200*b* in FIG. 13 may be implemented as at least one of the plurality of sub-image processors 1212*a*, 1212*b*, and 1212*c*, and at least one sub-image processor of the plurality of sub-image processors 1212*a*, 1212*b*, and 1212*c* may include the encoder (e.g., 250 in FIG. 13) and the decoder (e.g., 230 in FIG. 13).

On the other hand, in several embodiments, one sub-image processor may be arranged to correspond to a plurality of camera modules. For example, the sub-image processor 1212*a* and the sub-image processor 1212*c* may not be implemented as separate from each other as illustrated but may be implemented as integrated into one sub-image processor, and the image data provided by the camera module 1100*a* and the camera module 1100*c* may, after being selected by a select element (for example, a multiplexer), be provided to the integrated sub-image processor. In this case, the sub-image processor 1212*b* may not be integrated, and receive the image data from the camera module 1100*b*.

In addition, in several embodiments, the image data generated by the camera module 1100*a* may be provided to the sub-image processor 1212*a* via the image signal line ISLa, the image data generated by the camera module 1100*b* may be provided to the sub-image processor 1212*b* via the image signal line ISLb, and the image data generated by the camera module 1100*c* may be provided to the sub-image processor 1212*c* via the image signal line ISLc. In addition, the image data processed by the sub-image processor 1212*b* may be directly provided to the image generator 1214, but the image data processed by the sub-image processor 1212*a* and the sub-image processor 1212*c* may, after any one is selected by a select element (for example, a multiplexer), be provided to the image generator 1214.

Each of the sub-image processors 1212*a*, 1212*b*, and 1212*c* may perform an image processing, such as bad pixel correction, auto-focus correction, auto-white balance, auto-exposure (3A adjustment), noise reduction, sharpening, gamma control, and re-mosaic, on the image data provided by the plurality of camera modules 1100*a*, 1100*b*, and 1100*c*.

In several embodiments, the re-mosaic signal processing may, after being performed by each of the camera modules 1100*a*, 1100*b*, and 1100*c*, be provided to the sub-image processors 1212*a*, 1212*b*, and 1212*c*.

The image data processed by each of the sub-image processors 1212*a*, 1212*b*, and 1212*c* may be provided to the image generator 1214. The image generator 1214 may generate an output image by using the image data provided by each of the sub-image processors 1212*a*, 1212*b*, and 1212*c* according to image generation information or a mode signal.

The image generator 1214 may, according to the image generation information or the mode signal, generate the output image by merging at least a portion of the image data generated by the image processors 1212*a*, 1212*b*, and 1212*c*. In addition, the image generator 1214 may, according to the image generation information or the mode signal, generate the output image by selecting any one of the image data generated by the image processors 1212*a*, 1212*b*, and 1212*c*.

In several embodiments, the image generation information may include a zoom signal or zoom factor. In addition, in several embodiments, the mode signal may include, for example, a signal based on a mode selected by a user.

When the image generation information includes the zoom signal (zoom factor), and the camera modules 1100*a*, 1100*b*, and 1100*c* have different field of views from each other, the image generator 1214 may perform different operations from each other according to a type of the zoom signal. For example, when the zoom signal incudes a first signal, the output image may be generated by using the image data output from the sub-image processor 1212*a* of the image data output by the sub-image processor 1212*a* and the image data output by the sub-image processor 1212*c*, and the image data output from the sub-image processor 1212*b*. When the zoom signal includes a second signal different from the first signal, the output image may be generated by using the image data output from the sub-image processor 1212*c* of the image data output by the sub-image processor 1212*a* and the image data output by the sub-image processor 1212*c*, and the image data output from the sub-image processor 1212*b*. When the zoom signal includes a third signal different from the first signal and the second signal, the image generator 1214 may not perform such image data merging, and generate the output image by selecting any one of the image data output by each of the sub-image processors 1212a, 1212b, and 1212c. However, embodiments are not limited thereto, and a method of processing the image data may be modified and performed as necessary.

In several embodiments, the image processing device 1210 may further include a selector that select and transmit to the image generator 1214 the output of the sub-image processors 1212a, 1212b, and 1212c.

In this case, the selector may perform different operations from each other according to the zoom signal or zoom factor. For example, when the zoom signal includes a fourth signal (for example, the zoom ratio includes a first ratio), the selector may select and transmit to the image generator 1214 any one of the output from the sub-image processors 1212a, 1212b, and 1212c.

In addition, when the zoom signal includes a fifth signal different from the fourth signal (for example, the zoom ratio includes a second ratio), the selector may transmit sequentially to the image generator 1214 p (where p is a natural number equal to or greater than 2) output of the output from the sub-image processors 1212a, 1212b, and 1212c. For example, the selector may transmit sequentially the output from the sub-image processor 1212b and the output from the sub-image processor 1212c to the image generator 1214. In addition, the selector may transmit sequentially the output from the sub-image processor 1212a and the output from the sub-image processor 1212b to the image generator 1214. The image generator 1214 may generate one output image by merging p output that has been sequentially provided.

In this case, the image processing, such as re-mosaic, video/preview resolution size down scaling, gamma control, and high dynamic range (HDR) processing, may be performed in advance by the sub-image processors 1212a, 1212b, and 1212c, and then, the processed image data may be transmitted to the image generator 1214. Thus, even though the processed image data is provided to the image generator 1214 as one signal line via the selector, the image merging operation of the image generator 1214 may be performed at a high speed.

In several embodiments, the image generator 1214 may receive a plurality of image data having different exposure times from each other from at least one of the sub-image processors 1212a, 1212b, and 1212c, and perform the HDR processing on the plurality of image data, and then may generate the merged image data with the increased dynamic range.

The camera module controller 1216 may provide a control signal to each of the camera modules 1100a, 1100b, and 1100c. The control signal generated by the camera module controller 1216 may be provided to the corresponding camera modules 1100a, 1100b, and 1100c via control signal lines CSLa, CSLb, and CSLc, which are separated from each other.

Any one of the plurality of camera modules 1100a, 1100b, and 1100c may be designated as a master camera (for example, 1100b) according to the image generation information including the zoom signal or the mode signal, and the other camera modules (for example, 1100a and 1100c) may be designated as slave cameras. This piece of information may be included in the control signal, and provided to the corresponding camera modules 1100a, 1100b, and 1100c via the control signal lines CSL1, CSLb, and CSLc separated from each other.

According to the zoom factor or the operation mode signal, camera modules operating as the master camera and the slave cameras may be changed. For example, when the field of view of the camera module 1100a is wider than that of the camera module 1100b, and zoom factor indicates a lower zoom ratio, the camera module 1100a may operate as the master camera, and the camera module 1100b may operate as the slave camera. To the contrary, when the zoom factor indicates a high zoom ratio, the camera module 1100b may operate as the master camera, and the camera module 1100a may operate as the slave camera.

In several embodiments, the control signal provided by the camera module controller 1216 to each of the camera modules 1100a, 1100b, and 1100c may include a sync enable signal. For example, when the camera module 1100b is the master camera, and the camera modules 1100a and 1100c are slave cameras, the camera module controller 1216 may transmit the sync enable signal to the camera module 1100b. The camera module 1100b having received the sync enable signal may generate a sync signal based on the provided sync enable signal, and may provide the generated sync signal to the camera modules 1100a and 1100c via a sync enable signal line SSL. The camera module 1100b and the camera modules 1100a and 1100c may be synchronized to the sync signal, and transmit the image data to the application processor 1200.

In several embodiments, the control signal provided by the camera module controller 1216 to the plurality of camera modules 1100a, 1100b, and 1100c may include the mode information according the mode signal. Based on the mode information, the plurality of camera modules 1100a, 1100b, and 1100c may operate in a first operation mode and second operation mode with respect to the sensing speed.

The plurality of camera modules 1100a, 1100b, and 1100c may generate the image signal (for example, generate the image signal of a first frame rate) at a first speed, encode the generated image signal (for example, encode the image signal of a second frame rate high than the first frame rate) at a second speed higher than the first speed, and transmit the encoded image signal to the application processor 1200. In this case, the second speed may be equal to or less than 30 times of the first speed.

The application processor 1200 may store the received image signal, that is, encoded image signal, in in the internal memory 1230 equipped therein or the external memory 1400 outside the application processor 1200, and then, may read and decode the encoded signal from the internal memory 1230 or the external memory 1400, and may display the image data that is generated based on the decoded image signal. For example, a corresponding sub-processor corresponding to the plurality of sub-processors 1212a, 1212b, and 1212c of the image processing device 1210 may perform decoding, and in addition, may perform image processing on the decoded image signal.

The plurality of camera modules 1100a, 1100b, and 1100c may, in the second operation mode, generate the image signal (for example, generate the image signal of a third frame rate lower than the first frame rate) at a third speed lower than the first speed, and transmit the image signal to the application processor 1200. The image signal provided to the application processor 1200 may be an un-encoded signal. The application processor 1200 may perform the image processing on the received image signal, or store the image signal to the internal memory 1230 or the external memory 1400.

The PMIC 1300 may provide power, for example, a power voltage to each of the plurality of camera modules

1100*a*, 1100*b*, and 1100*c*. For example, the PMIC 1300 may provide a first power to the camera module 1100*a* via the power signal line PSLa under the control of the application processor 1200, provide a second power to the camera module 1100*b* via the power signal line PSLb, and provide a third power to the camera module 1100*c* via the power signal line PSLc.

The PMIC 1300 may, in response to a power control signal PCON from the application processor 1200, generate power corresponding to each of the plurality of camera modules 1100*a*, 1100*b*, and 1100*c*, and in addition, may adjust a level of the power. The power control signal PCON may include a power adjustment signal per operation mode of the plurality of camera modules 1100*a*, 1100*b*, and 1100*c*. For example, the operation mode may include a low power mode, and in this case, the power control signal PCON may include information about a camera module operating at a low power mode and a set power level. The level of power provided to each of the plurality of camera modules 1100*a*, 1100*b*, and 1100*c* may be identical to or different from each other. In addition, the level of power may be dynamically changed.

Figure 16:
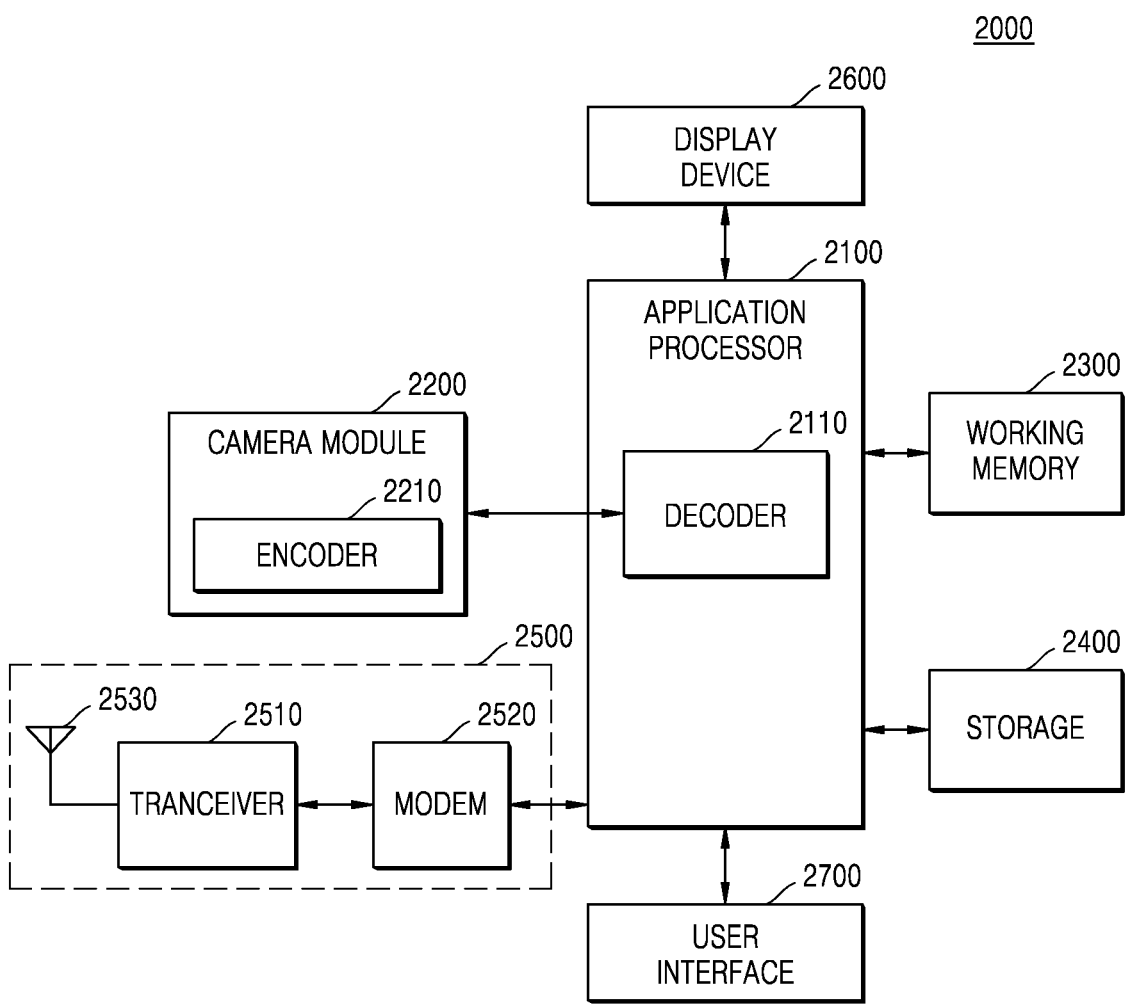
FIG. 16 is a schematic block diagram of an electronic device according to an embodiment.

FIG. 16 illustrates an electronic device 2000, according to an embodiment. The electronic device 2000 of FIG. 16 may include a mobile terminal.

Referring to FIG. 16, the electronic device 2000 may include an application processor 2100, a camera module 2200, a working memory 2300, a storage 2400, a display device 2600, a user interface 2700, and a wireless transceiver 2500.

The application processor 2100 may control operations of the electronic device 2000, and may be implemented as a system on chip (SoC) driving application programs, operating systems, or the like. The application processor 2100 may provide to the display device 2600 or store in the storage 2400 the image data provided by the camera module 2200.

The image sensor modules 100 and 100*a* described above with reference to FIGS. 1 through 11B may be applied to the camera module 2200. The camera module 2200 may include an encoder 2210, and the encoder 2210 may generate compressed data by compressing the image data, and transmit the compressed data to the application processor 2100. As described above, when at least some of the image data, for example, when at least one pixel group corresponds to an isolated region, the encoder 2210 may compress the pixel group by using the HV balance encoding method.

The application processor 2100 may include a decoder 2110 which de-compresses the compressed data by using a decoding method corresponding to the compression method of the encoder 2210, for example, the encoding method. The decoder 2110 may de-compress the compressed data received from the camera module 2200 and generate the restored image data, and the application processor 2100 may perform an image processing on the restored image data. The application processor 2100 may display on the display device 2600, or store in the storage 2400 the restored image data or the image-processed image data.

The working memory 2300 may be implemented as a volatile memory, such as DRAM and SRAM, or a non-volatile memory, such as FeRAM, RRAM, and PRAM. The working memory 2300 may store programs and/or data which the application processor 2100 executes or processes.

The storage 2400 may be implemented as a non-volatile memory, such as, a NAND flash memory and resistive memory, and the storage 2400 may be provided as, for example, memory cards, such as multi-media card (MMC), embedded MMC (eMMC), secure card (SD), and micro SD. The storage 2400 may store image data received from the camera module 2200 or data processed or generated by the application processor 2100.

The user interface 2700 may be implemented as various devices capable of receiving a user input, such as a keyboard, a curtain key pad, a touch panel, a finger print sensor, and a mike. The user interface 2700 may receive the user input, and provide to the application processor 2100 a signal corresponding to the received user input.

The wireless transceiver 2500 may include a transceiver 2510, a modem 2520, and an antenna 2530.

While the present disclosure has been particularly shown and described with reference to embodiments thereof, it will be understood by those of ordinary skill in the pertinent art that various changes in form and details may be made therein without departing from the spirit and scope of the following claims.

What is claimed is:

1. An image compression method comprising:
   receiving pixel values of a plurality of target pixels of image data on which compression is to be performed, and reference values of reference pixels to be used in compression of the target pixels;
   determining an averaging direction among a first direction and a second direction, the second direction being different to the first direction;
   averaging pixel values for each of at least two pairs of target pixels adjacent to each other in the averaging direction among the plurality of target pixels to generate at least two average values;
   generating balance information comprising compensation values to be applied to the at least two average values based on the reference pixels; and
   generating a bitstream comprising the at least two average values, the balance information, and averaging direction information.

2. The image compression method of claim 1, wherein:
   the image data generated by an image sensor,
   the reference values correspond to restored pixel values of the reference pixels that have been compressed ahead of the target pixel group, and a difference between at least one pixel value of the pixel values and the reference values is equal to or greater than a threshold value.

3. The image compression method of claim 1, wherein the averaging comprises calculating a first average value and a second average value for two pairs of target pixels in the averaging direction among the target pixels.

4. The image compression method of claim 3, wherein the generating of the balance information comprises generating balance information about a first pair of target pixels based on a difference value for the first pair of target pixels among the two pairs of target pixels and a difference value for a first pair of reference pixels among the reference pixels.

5. The image compression method of claim 4, wherein the balance information comprises a first select value and a first slope value for the first pair of target pixels,
   wherein the first select value indicates whether to apply a difference value for the first pair of reference pixels to the first average value, and
   the first slope value indicates a target pixel having a greater pixel value among the first pair of target pixels.

6. The image compression method of claim 5, wherein, when the first select value indicates that the difference value for the first pair of reference pixels is not applied to the first average value for the first pair of target pixels, a preset default value is set to be applied to the first average value.

7. The image compression method of claim 4, wherein the balance information comprises a select value and a slope value for each of the two pairs of target pixels.

8. The image compression method of claim 4, wherein the balance information comprises a select value for each of the two pairs of target pixels and a slope value to be applied commonly to the two pairs of target pixels.

9. The image compression method of claim 1, wherein the bitstream comprises a header and a data block, and
the averaging direction information is comprised in the header or the data block.

10. The image compression method of claim 1, further comprising:
after the bitstream is generated, generating restored pixel values by de-compressing the bitstream; and
based on the restored pixel values, generating a restored image comprising reference pixels to be used for compression of a next target pixel group to which compression is to be performed after the target pixel group.

11. The image compression method of claim 1, wherein the target pixel group comprises four pixels corresponding to an identical color and arranged in a 2×2 matrix.

12. An imaging apparatus comprising:
an image sensor configured to generate image data comprising a plurality of pixels;
an encoder configured to generate compressed data comprising a plurality of bitstreams by sequentially compressing the image data generated by the image sensor in units of pixel groups, and to compress a target pixel group to be compressed according to at least one encoding method of a plurality of encoding methods; and
an interface configured to output the compressed data to an external image processing device,
wherein the encoder, according to a first encoding method of the plurality of encoding methods, determines an averaging direction among a first direction and a second direction, the second direction being different to the first direction, generates at least two average pixel values for at least two pairs of target pixels adjacent to each other in the averaging direction among a plurality of target pixels, generates balance information comprising compensation values to be applied to the at least two average pixel values, and generates a bitstream comprising the at least average pixel values, the balance information, and averaging direction information.

13. The imaging apparatus of claim 12, wherein the encoder determines the averaging direction in which the averaging calculation is to be performed on the pixel values of the target pixels based on reference values which correspond to restored pixel values of the reference pixels that have been compressed ahead of the target pixel group.

14. The imaging apparatus of claim 13, wherein the encoder determines a select value and a slope value for a first pair of target pixels based on a difference value for the first pair of target pixels in the averaging direction, from among the target pixels, and a difference value for a first pair of reference pixels of the reference pixels.

15. The imaging apparatus of claim 12, wherein the encoder generates a plurality of pieces of encoded data by compressing the target pixel group according to the plurality of encoding methods, and selects encoded data having a smallest error rate of the plurality of pieces of encoded data as compressed data for the target pixel group.

16. The imaging apparatus of claim 12, wherein, when a difference between a pixel value of a target pixel of the target pixel group and a reference value is equal to or greater than a threshold value, the encoder compresses the target pixel group according to the first encoding method of the plurality of encoding methods.

17. The imaging apparatus of claim 12, wherein at least one bitstream of the plurality of bitstreams comprises difference values, select values, and slope values for the target pixels.

18. An image processing system comprising:
an image sensor configured to sense a received optical signal and generate image data;
an encoder configured to sequentially compress a plurality of pixel groups of the image data and generate a plurality of bitstreams; and
a decoder configured to de-compress the plurality of bitstreams and restore the image data,
wherein the encoder determines an averaging direction among a first direction and a second direction, the second direction being different to the first direction, respectively, generates at least two average pixel values for at least two pairs of target pixels adjacent to each other in the averaging direction among a plurality of target pixels, generates compensation values to be applied to the at least two average values, and generates a bitstream comprising the at least two average values, the compensation values, and averaging direction information.

19. The image processing system of claim 18, wherein the image data comprises four pixels corresponding to an identical color and arranged in a 2×2 matrix.

20. The image processing system of claim 18, wherein the plurality of bitstreams are transmitted from the encoder to the decoder via a camera serial interface based on a mobile industry processor interface (MIPI).

* * * * *